United States Patent [19]

Hatakeyama et al.

[11] Patent Number: 5,454,105

[45] Date of Patent: Sep. 26, 1995

[54] DOCUMENT INFORMATION SEARCH METHOD AND SYSTEM

[75] Inventors: Atsushi Hatakeyama, Kokubunji; Kanji Kato, Tokorozawa; Satoshi Asakawa, Hirakata; Hisamitsu Kawaguchi, Sagamihara, all of Japan

[73] Assignee: Hitachi, Ltd., Tokyo, Japan

[21] Appl. No.: 31,700

[22] Filed: Mar. 15, 1993

Related U.S. Application Data

[63] Continuation-in-part of Ser. No. 985,795, Nov. 30, 1992, which is a continuation of Ser. No. 555,483, Aug. 9, 1990, Pat. No. 5,168,533.

[30] Foreign Application Priority Data

| Jun. 14, 1989 | [JP] | Japan | 1-149630 |
|---|---|---|---|
| Jul. 24, 1989 | [JP] | Japan | 1-188772 |
| Jul. 24, 1989 | [JP] | Japan | 1-188773 |
| Sep. 8, 1989 | [JP] | Japan | 1-231567 |
| Mar. 19, 1992 | [JP] | Japan | 4-063064 |

[51] Int. Cl.⁶ .................................................. G06F 17/30
[52] U.S. Cl. .................. 395/600; 364/282.1; 364/252.3; 364/DIG. 1
[58] Field of Search ............................................ 395/600

[56] References Cited

U.S. PATENT DOCUMENTS

| 4,516,166 | 5/1985 | Tellone et al. | 360/72.1 |
|---|---|---|---|
| 4,823,306 | 4/1989 | Barbie et al. | 364/900 |
| 5,168,533 | 12/1992 | Kato et al. | 382/54 |

FOREIGN PATENT DOCUMENTS

| 0266586 | 5/1988 | European Pat. Off. . |
|---|---|---|
| 0437615 | 7/1991 | European Pat. Off. . |
| 63-198124 | 8/1988 | Japan . |
| 3-125263 | 5/1991 | Japan . |
| 3-174652 | 7/1991 | Japan . |
| 5-55912 | 8/1993 | Japan . |
| 5-76068 | 10/1993 | Japan . |
| WO9016036 | 12/1990 | WIPO . |

OTHER PUBLICATIONS

Kimbrell, Roy E. "State Machines Find the Pattern," Computer Design, vol. 24, No. 5, May 1985, pp. 163–169. (English).

Sellis, Timos K. "Multiple-Query Optimization," ACM Transactions on Database Systems, vol. 13, No. 1, Mar. 1988, pp. 23–52. (English).

Alsabbagh, J. R., et al, "A Framework for Multiple-Query Optimization," IEEE Second International Workshop on Research Issues on Data Engineering: Transaction Query Processing, Cat. No. 92TH0417 6, Feb. 3, 1992, pp. 157–162. (English).

Kang, Myong H., et al. "Algorithm Choice for Multiple-Query Evaluation," Parbase-90 International Conference on Databases, Parallel Architectures and Their Applications, Cat. No. 90CH2728-4, Mar. 9, 1990, p. 535. (English).

(List continued on next page.)

Primary Examiner—Thomas G. Black
Assistant Examiner—Peter Y. Wang
Attorney, Agent, or Firm—Fay, Sharpe, Beall, Fagan, Minnich & McKee

[57] ABSTRACT

A document search method and system for searching and retrieving a document containing a specific character string in response to search requests issued by a plurality of search request sources. When a search request is received in the course of execution of a search processing for an earlier prior search request, the former is stored in a queue buffer. When a plurality of search requests have been stored in a queue buffer in this manner, a search processing is performed for the plurality of search requests simultaneously as stored. The results of search processing as performed are then distributively outputted to the relevant search request sources, respectively. Output buffers for storing a set of search results of the search processings performed in the past may be provided in correspondence to the search request sources, respectively, for screening the documents for which the character string search is to be performed.

30 Claims, 27 Drawing Sheets

OTHER PUBLICATIONS

Mukhopadhyay, Uttam, et al. "An Intelligent System for Document Retrieval in Distributed Office Environments," Journal of the American Society for Information Science, vol. 37, No. 3, May 1986, pp. 123–135. (English).

Kim, Michelle Y. "Synchronized Disk Interleaving," IEEE Transactions on Computers, vol. C–35, No. 11, Nov. 1986, pp. 978–988. (English).

Haskin, Roger L. "Operational Characteristics of Hardware–Based Pattern Matcher," ACM Transactions on Database Systems, vol. 8, No. 1, Mar. 1983, pp. 15–40.

Faloutsos, et al., "Signature Files: An Access Method for Documents and Its Analytical Performance Evaluation," ACM Transactions on Office Information Systems, vol. 2, No. 4, Oct. 1984, pp. 267–288.

Aho, Alfred V., et al. "Efficient String Matching: An Aid to Bibliographic Search," Communications of the ACM, vol. 18, No. 6, Jun. 1975, pp. 333–340.

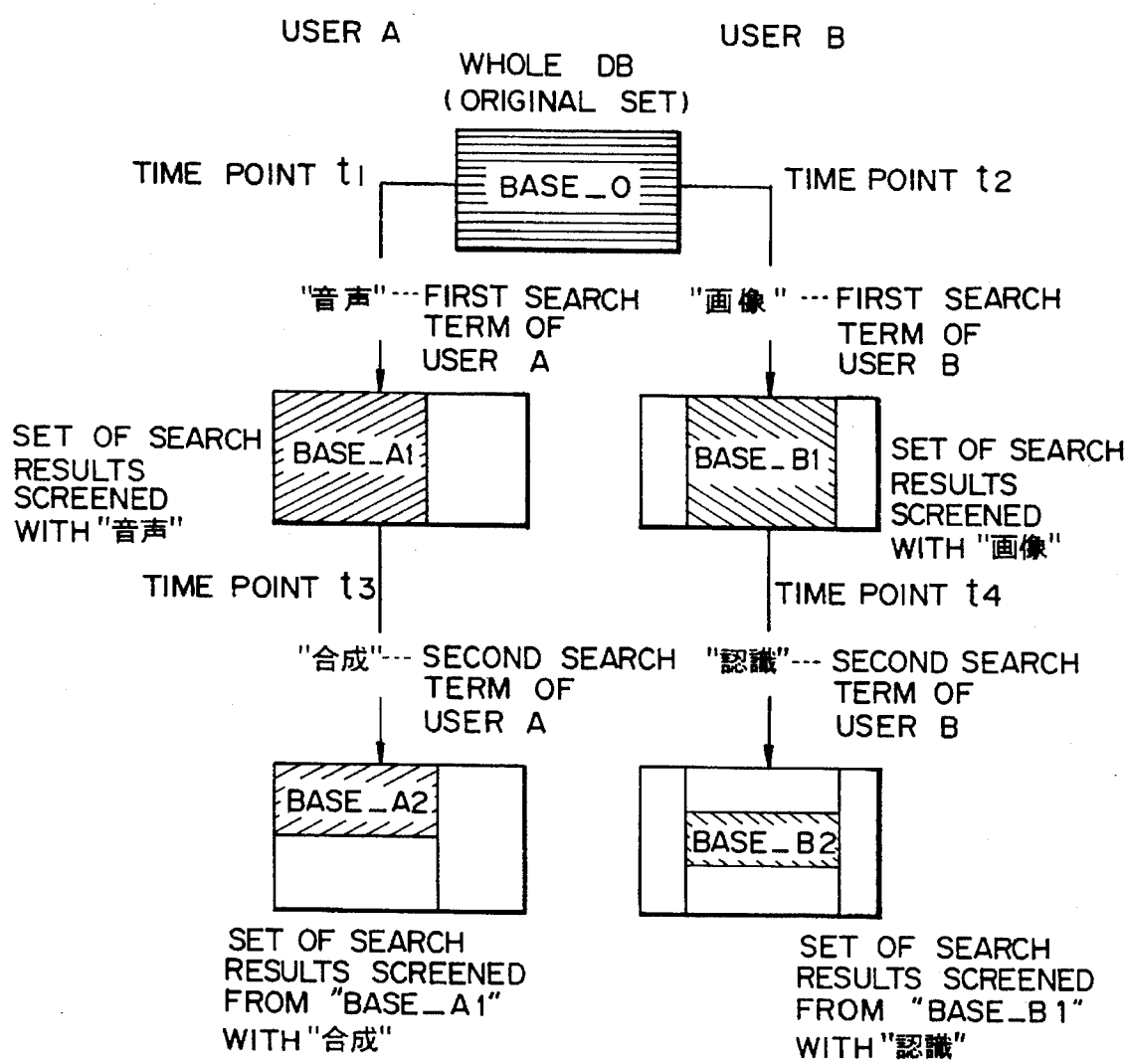

FIG.22

| DATABASE NAME | CORRESPONDING TSM NUMBER |
|---|---|
| PRESS NEWS | 1, 2 |
| PROCEEDINGS | 3 |
| MANUAL | 4 |
| REPORT | 5, 6 |
| TREATISE | 7, 8, 9 |

DOCUMENT INFORMATION SEARCH METHOD AND SYSTEM

CROSS-REFERENCE TO RELATED APPLICATION

This is a continuation-in-part of copending application Ser. No. 07/985,795 filed on Nov. 30, 1992 which is a continuation of U.S. Ser. No. 07/555,483, filed Aug. 9, 1990 and now U.S. Pat. No. 5,168,533, dated Dec. 1, 1992.

BACKGROUND OF THE INVENTION

The present invention relates generally to an information (data) search or retrieval system which allows a plurality of users to utilize in a time-sharing mode a function or facility for searching full text of documents containing a particular character string or strings from a document database or databases. More particularly, the present invention is concerned with a document information search method and a system for carrying out the same, in which a waiting time involved in the search processing can advantageously be suppressed to a possible minimum even in the case where a plurality of users issue simultaneously respective search requests.

A full text search system in which registration of documents in a database necessitates no assignment of keywords to the documents has already been proposed, as is disclosed in JP-A-03-174652 (which corresponds to U.S. Pat. No. 5,168,533 issued on Dec. 2, 1992). In this known full text search system, condensed texts generated by compressing documents on a word basis and a character component table registering therein character strings used for the search on a single-character basis are used for carrying out the full text search at a sufficiently high speed for practical applications.

However, in this known search system, it is indispensable to search the text data on a character-by-character basis even though the text is condensed. Consequently, a CPU constituting a central part of the search system has to perform incessantly character matching procedure throughout data scanning operation and can afford no time to be spared for execution of other processings. This in turn means that a great difficulty will unavoidably be encountered in an attempt for providing services to a plurality of users in a time-sharing operation mode.

For more particulars, let's assume, by way of example, that a plurality of user terminals are connected to a search system which is adapted for performing the full text search and that search requests are frequently issued from each of the individual terminals. In that case, so long as the character matching operation is continued for a given one of the search requests while scanning the texts, all the other search requests are inevitably forced to wait for completion of the above-mentioned character matching operation, because the CPU is incapable of performing any other operations or processings during execution of the character matching procedure.

Furthermore, when search requests are issued in succession by the terminals in the state where the search processing performed by the CPU for a preceding search request or requests has not yet been completed, the time for which the search requests are forced to wait for processing increases significantly particularly for those requests which have arrived at the search system at later time points, since the search requests are processed by the search system in the sequential order in which the search requests arrive at the system, thus giving rise to another problem.

SUMMARY OF THE INVENTION

In the light of the state of the art reviewed above, it is therefore an object of the present invention to provide a document information (data) search or retrieving method and a system for carrying out the same, in which a full text search system having a plurality of terminals connected thereto is capable of furnishing results of search to the relevant terminals with a quick response time which is equivalent in appearance to that attainable in the processing performed for a search request issued by a single terminal, even when a number of search requests are issued in succession by a plurality of terminals connected to the system.

In view of the above and other objects which will become apparent as description proceeds, there is proposed according to an aspect of the present invention a document information or data search method and a system, which is provided with a facility for storing those search requests which are received from other terminals in the course of execution of search processing for a search request issued preceedingly by one terminal, and a facility for performing a search processing en bloc or simultaneously for a plurality of the search requests as stored.

To this end, the search system implemented in a preferred configuration according to an aspect of the present invention may include functions or units such as those mentioned below:

(1) character string matching unit, (2) unit for storing and reading text data, (3) unit for receiving search requests from a plurality of search terminals, (4) search request stacking queue buffer, (5) search request source identifying facility, (6) unit for consolidating or unifying search requests stored cumulatively in the waiting queue buffer by affixing corresponding request source indicating identifiers to the search requests, (7) unit for storing sets of documents retrieved from the search distinctively for the search request sources or terminals, respectively, (8) unit for temporarily holding the search result information distinctively for the search request sources, respectively, and then transferring the information to the relevant or corresponding request sources, and (9) unit for performing at one time the search processing for the consolidated search requests and allowing the results of the search processing to be allotted to the relevant request sources, respectively.

The search processing executed with the aid of the facilities mentioned above will briefly be described below.

In order to allow search requests issued by the terminal(s) to be accepted even in the course of search processing, there is conceived such a method according to which a queue buffer is provided, as shown in FIG. 1 of the accompanying drawings, wherein the search requests as received during execution of the search processing are successively registered in the queue buffer as the waiting queues.

With this method, however, the search requests registered at later time points are necessarily forced to wait for the search processings therefor until the search processings for all the search requests registered at earlier time points have been completed. As an approach for coping with this problem, there is proposed according to the present invention a processing for consolidating the search requests accumulated in the waiting queue buffer by checking the identification of the search results thereof upon fetching them from the buffer, to thereby make it possible to send the results of search to all the relevant search request sources through a single search processing regardless of the sequence in which the search requests have been registered in the queue buffer, as is illustrated in FIG. 2. This search request consolidating processing as well as a method of sending the search results to the request sources or terminals will be outlined below.

It is assumed, by way of example, that there are stored in the queue buffer the search condition statements or queries such as exemplified by "search a document in which a term '計算機(computer)' makes appearance", "search a document containing a term 'バイオ技術(bio-technology)'", and "search a document containing a phrase '学習型ユーザインタフェース(leaning type user interface)'", respectively. In that case, according to the search request consolidating processing taught by the invention, the above-mentioned search queries are consolidated into a new query reading "search a document in which any one of terms '計算機(computer)', 'バイオ技術(bio-technology)' and '学習型ユーザインタフェース(leaning type user interface)' makes appearance", whereon the search processing is performed on the basis of this new query consolidating the search requests.

The queue buffer which is in charge of managing the search requests is designed for registering therein the query statements of the search requests together with the identifiers of the terminals issued these requests, respectively. Thus, in the case of the example mentioned above, the search requests are processed in the manner mentioned below. Assuming that the following search requests are placed in the queue buffers:

queue 1=u1: "計算機(computer)"

queue 2=u2: "バイオ技術(bio-technology)"

queue 3=u3: "学習型ユーザインタフェース(leaning type user interface)"

then the search requests are combined or consolidated as follows:

```
queue 1 =   u1:   " (computer)" or
            u2:   " (bio-technology)" or
            u3:   " (leaning type user interface)"
``` where u1, u2 and u3 denote the identifiers of the search request sources or terminals, respectively.

With the search request consolidated or unified in the manner as mentioned just above, the search processing is performed for finding out the document which can satisfy any one of the query conditions or statements given by the search requests. In the case of the aforementioned example, the search processing is performed for retrieving a document which contains any one of the terms "計算機", "バイオ技術" and "学習型ユーザインタフェース". When a document is hit in the search, a document identifier (hereinafter also referred to as the document ID) specifying that document is outputted together with the identifier indicating the relevant request source which issued the search request for the hit document. For example, representing the document ID by "dxx" (where "x" represents a numeral, the information as outputted may be:

d1, u1, u3, u5
d3, u2
d10, u3, u4
d25, u2, u5
d37, u5

In the case of the above mentioned example, it can be seen that the query statements given by the search requests issued from the request sources or terminals u1, u3 and u5 are satisfied by retrieving the document represented by the document ID "d1".

Next, a processing for allotting the output results of the search to the request sources will be considered. This processing can be realized with the aid of the request source identifiers. In the case of the aforementioned example, the results of search (also referred to as the search results) are placed within search result sets prepared on the basis of the request source identifiers "uxx", as follows:

u1: (d1)
u2: (d3, d25)
u3: (d1, d10)
u4: (d10)
u5: (d1, d25, d37)

As can be seen, the first mentioned set shows that a document identified by "d1" has been found which satisfies the query statement or condition given by the search request of the terminal identified by the request source identifier "u1". The sets of the search results thus obtained are outputted to the relevant request sources or terminals, respectively.

As can now be understood, the response performance of the search system is remarkably enhanced by executing the search processing by consolidating the search requests issued from a plurality of search request sources or terminals. In the case of the example mentioned just above where five search requests are dealt with, the processing can be completed by scanning only once the text data, which otherwise would require the text scanning as many as five times. Such reduction in the number of the text scanning processes is attributable to the fact that the five search requests are consolidated or unified in the manner described previously.

Next, the concept underlying the search system will be described, which is imparted with further high performance or function according to another aspect of the present invention. In the full text search where text scanning is prerequisite, decrease in the amount of text data to be scanned can certainly lead to reduction in the time taken for the search processing. Further, it is noted that in an overwhelming majority of the search methods, there is already adopted a so-called screening search process for screening or decreasing the text data subjected to the search by adding new query condition to a set of the results of the preceding search processing. More specifically, in most of the conventional search methods, a set of the search results once screened out is further screened while changing the key-words or search terms in a progressive manner. Thus, the search is not always performed on a whole database (original data set).

As is self-explanatory, the screening search can reduce the processing time or search time since only the set of data retrieved through the preceding search is scanned instead of scanning all data. Parenthetically, the search process in which a set of documents whose number has once been decreased as a result of a preceding search is repeatedly subjected to a series of search processings with the range for the search being thus progressively narrowed upon every successive search processing will also be referred to as the hierarchical search.

At this juncture, it should be mentioned that for realizing the hierarchical search function with a system having a plurality of terminals connected thereto, there arise problems concerning how to manage the data subjected to the search, how to set a time point for accepting a plurality of requests and others. These problems will be discussed by using a concrete example illustrated in FIG. 3A. In the case of the example shown in this figure, it is assumed that a user A generates or creates a set of documents "BASE_A1" which contain a search term "音声(voice)" at a time point $t_1$ and subsequently performs a screening search on this document set "BASE_A1" by using another search term "合成(synthesization)" at a time position t1. On the other hand, another user B creates a set of documents "BASE_B1" which contain a search term "画像(image)" at a time point $t_2$ and subsequently performs a screening search on the document set "BASE_B1" by using a search term "認識(recognition)" at a time point $t_4$. Thus, in the second searches conducted by the users A and B, respectively, it is necessary to perform the search processings separately for the mutually different document sets "BASE_A1" and "BASE_B1", respectively. This means in more general sense that difficulty will be encountered in the attempt for processing a plurality of search requests simultaneously or en bloc. More specifically, it is impossible to execute both the character string search processings simultaneously instead of performing them at the discrete time points $t_3$ and $t_4$, respectively.

For solving the above problem, it is necessary to consolidate into one set the document sets for which the search queries differ from one other, so that a plurality of search requests can be disposed of through a single search processing. This problem may certainly be solved by performing constantly the search processings on the whole database, whereon logical products between the results of the search processing performed on the whole database and the results of search performed on subsets which satisfy the second queries of the search request sources, respectively, are determined, as is illustrated in FIG. 3B. Since this search method always starts from the whole database or DB in abbreviation, i.e., the original set "BASE_0", the second search requests issued by the users A and B can be disposed of through a single character string search processing performed at a time point $t_3$. In more particular, at the time point $t_3$, the search of the documents containing either one of "合成(synthesization)" or "認識(recognition)" which are contained in the search queries given by the users A and B is performed on the whole database "BASE_0". After completion of this search operation, the set "BASE_AB2" including the documents in which "合成" or "認識" make appearance is produced. And then the results of the search are classified into subsets referred to as the search result sets allotted to the users A and B, respectively, whereupon logical products are determined between the search result set "BASE_AB" for the users A and B and the sets "BASE_A1" and "BASE_A2", respectively, which ultimately results in determination of the desired search result sets "BASE_A2" and BASE_B2" for the users A and B, respectively. Thus, the method illustrated in FIG. 3B is certainly advantageous over the method shown in FIG. 3A in that the character string search processings performed at the discrete time points $t_3$ and $t_4$ according to the method of FIG. 3A can be executed simultaneously, i.e., at a same time point. However, in the method shown in FIG. 3B, all the document data or text data of the whole datable "BASE_0" must always be scanned. Consequently, lots of time is taken for the search processing because of enormous amount of the text data involved in the search processing, presenting a problem.

Under the circumstances, there may be conceived an en-bloc search method performed on the basis of a logical OR set between the sets "BASE_A1" and "BASE_B1", as is illustrated in FIG. 3C. With this method, the number of the items subjected to the search is small, and the amount of data for which the search processing is to be performed can certainly be reduced. However, with a mere allotment of the search results obtained from the logical ORing of the sets "BASE_A1" and BASE_B1", it is impossible to obtain the correct search results to be ultimately determined, because data in the areas shown in cross-hatching (i.e., in the case of the example of the user A, document data included in the set "BASE_B1" while excluded from "BASE_A1" and contain "合成(synthesization)") become falsified as noise. In the search system designed to operate in the multiple-user (or multi-terminal) environment, the search terms usually differ from one to another user with the steps of the screening operations differing similarly even in the case where the database subjected to the search is one and the same, as a result of which the sets subjected to the searches desired by the individual users will usually differ from one another at any given time point. Accordingly, even when the database search is to be performed en bloc with search terms (search character strings) given by the individual users by logically ORing the document data sets generated by the users, it is impossible to obtain the sets of correct search results.

In the light of the foregoing, it is proposed according to another aspect of the present invention that sets of search results obtained for the respective users or search request sources through an en-bloc search processing are subjected to the logical AND operation to thereby determine the sets resulting therefrom as the search results which satisfy the search queries of the users, as is illustrated in FIG. 4. More specifically, at the time point $t_3$, the search result set "BASE_AB2" is allotted or divided into the result subsets for the users A and B, respectively, whereon logical products between these result subsets "BASE_AB2A" and "BASE_AB2B" and the data sets "BASE_A1" and "BASE_B1" for the second searches requested by the users A and B are determined, respectively. Through this procedure, there can be obtained correct results of search for each of the search request sources without being accompanied with any search noise. Namely, the logical product "BASE_AB3A" is generated for user A by ANDing of the set "BASE_AB2A" and the set "BASE_A1" and the "BASE_AB3B" for user B by ANDing of "BASE_AB2B" and "BASE_B1".

In the following, by reference to FIG. 24 as well, explanation will be made for proving that the search result "BASE_AB3A" obtained for the search request of the user A through the procedure shown in FIG. 4 is equal to the set "BASE_A2" to be determined, on the assumption that the results of character string based searches are expressed by "BASE_xx ('character string')". The above expression represents a set of results of a search performed on a set "BASE_xx" for finding documents containing the "character string" designated in the above expression. By say of example "BASE_0 ("音声")" represents a set of results of the search performed on a set "BASE_0" with the search term or character string "音声(voice)" and thus represents the same set as "BASE_A1". By using the above-defined expression, the search result set "BASE_AB3A" shown in FIG. 4 can be developed as follows.

```
BASE_AB3A = BASE_A1 AND BASE_AB2A
         = BASE_A1 AND BASE_AB2 ("合成")
         = BASE_A1 AND BASE_AB1
           (("認識" OR "合成") AND "合成")
         = BASE_A1 AND BASE_AB1 ("合成")
         = BASE_A1 AND
           (BASE_AB1 ("合成") OR
            BASE_B1 ("合成"))
         = (BASE_A1 AND BASE_A1 ("合成"))
           OR (BASE_A1 AND BASE_B1 ("合成"))
```

FIG. 24 shows relations among the search result sets mentioned above. As can be seen in this figure, the logical product set "BASE_A1 AND BASE_B1" between the sets "BASE_A1" and "BASE_B1" is included by the set "BASE_A1". Therefore, the logical product set "(BASE_A1 AND BASE_B1 ) ("合成")" is also included completely by the set "BASE_A1 ("合成")". Thus,

```
BASE_AB3A = BASE_A1 ("計算機")
         = BASE_A2
```

The arithmetic determination for the logical conditions between the sets can be processed within a shorter time when compared with the character string search process. Accordingly, it can be said that the search system now under consideration which is capable of decreasing the number of the sets for the character string search processing to a possible minimum is in the position to process en bloc the search requests asked for by a plurality of users within a short time.

In conjunction with the search system which is imparted with the hierarchical search function mentioned above, description will now be made in some detail concerning the processing performed when a plurality of aforementioned search requests are cumulatively held by a queue buffer.

It is assumed, by way of example only, that the following search result sets have been obtained up to a current time point in response to search requests from the individual search terminals or sources.

u1: (d1, d5, d12, d15, d18, d27)
u2: (d2, d5, d7, d12, d18)
u3: (d1, d5, d18, d30)
u4: (d3, d7, d12, d30, d42, d50, d52)
u5: (d2, d5, d8, d12, d18, d42, d52)

It is further assumed that undermentioned search requests to be processed are now placed within the queue buffer.

queue 1=u1: "計算機(computer)"

queue 2=u2: "バイオ技術(bio-technology)"

queue 3:=u3: "学習型ユーザインタフェース(leaning type user interface)"

Since the search requests have been issued from the terminals u1, u2 and u3, the search result sets for u1, u2 and u3 are logically ORed, whereon only the text data of the documents contained in the set resulting from the logical OR operation are scanned to search those documents which contain any one of the terms "計算機", "バイオ技術" and "学習型ユーザインタフェース". For the documents as hit in this search, the corresponding document identifiers or IDs are outputted together with the identifiers of the request sources. Namely, text data of the documents contained in the result set u1 or u2 or u3:

(d1, d2, d5, d7, d12, d15, d18, d27, d30)

are scanned to obtain, for example, results of the search mentioned below:

d1, u1, u3
d5, u2
d12, u2, u3
d15, u1
d30, u2

Subsequently, the above results are allotted or classified on a request-source basis. However, since mere allotment results in delivery of documents which include false noises to the source-based search result sets, logical AND sets between the allotted sets and the source-based result sets are determined as the ultimate search results. Namely, the search results are once classified on a request-source basis as follows:

u1: (d1, d15)
u2: (d5, d12, d30)
u3: (d1, d12)

Subsequently, logical products between the above sets and the base result sets upon which was first performed by the aforementioned logical OR operation are determined. Thus, correct results can be obtained, as follows:

u1: (d1, d15)
u2: (d5, d12)
u3: (d1)

As will now be understood from the foregoing, there can be realized a search system which has a function of hierarchical search and which can ensure high-speed response by screening previously the document data to be scanned on the basis of search result sets, performing the search processing by ORing the search requests and logically ANDing the search results obtained on a request-source basis.

In summary, by holding cumulatively the search requests issued by a plurality of search sources or terminals in a queue buffer and performing the search processing by using a consolidated or single search request at a time point when a preceding search is finished. Since in the event predetermined number of search requests have been placed in the buffer, there can be provided a search system which features significant reduction in the waiting time. In the consolidated search query, the request source identifiers are affixed to the respective individual search requests, which identifiers are contained in the character string matching results as well. Thus, after the en-bloc search processing with the consolidated search query, the result sets can easily be assigned to the relevant search request sources, respectively.

Further, by providing a facility for storing the search result sets in the past for each of the search request sources, wherein in the screening search mode, the set resulting from logical ORing of the results sets obtained for the search request sources, respectively, is subjected to the search processing realized by scanning the text data with the consolidated search query, not only the amount of data to be scanned can be decreased but also the time taken for the search processing can be shortened. Besides, by logically ANDing the sets obtained after the above-mentioned ORing operation and the search results obtained on the request-source basis, there can correctly be derived the search result for each of the search request sources.

BRIEF DESCRIPTION OF THE DRAWINGS

FIGS. 3A to 3C are flow charts for illustrating generation of noise in en-bloc processings;

FIG. 22 is a view showing a configuration of a DB-TSM correspondence table;

DESCRIPTION OF THE PREFERRED EMBODIMENTS

Now, the present invention will be described in conjunction with preferred on exemplary embodiments by reference to the accompanying drawings.

Figure 5:
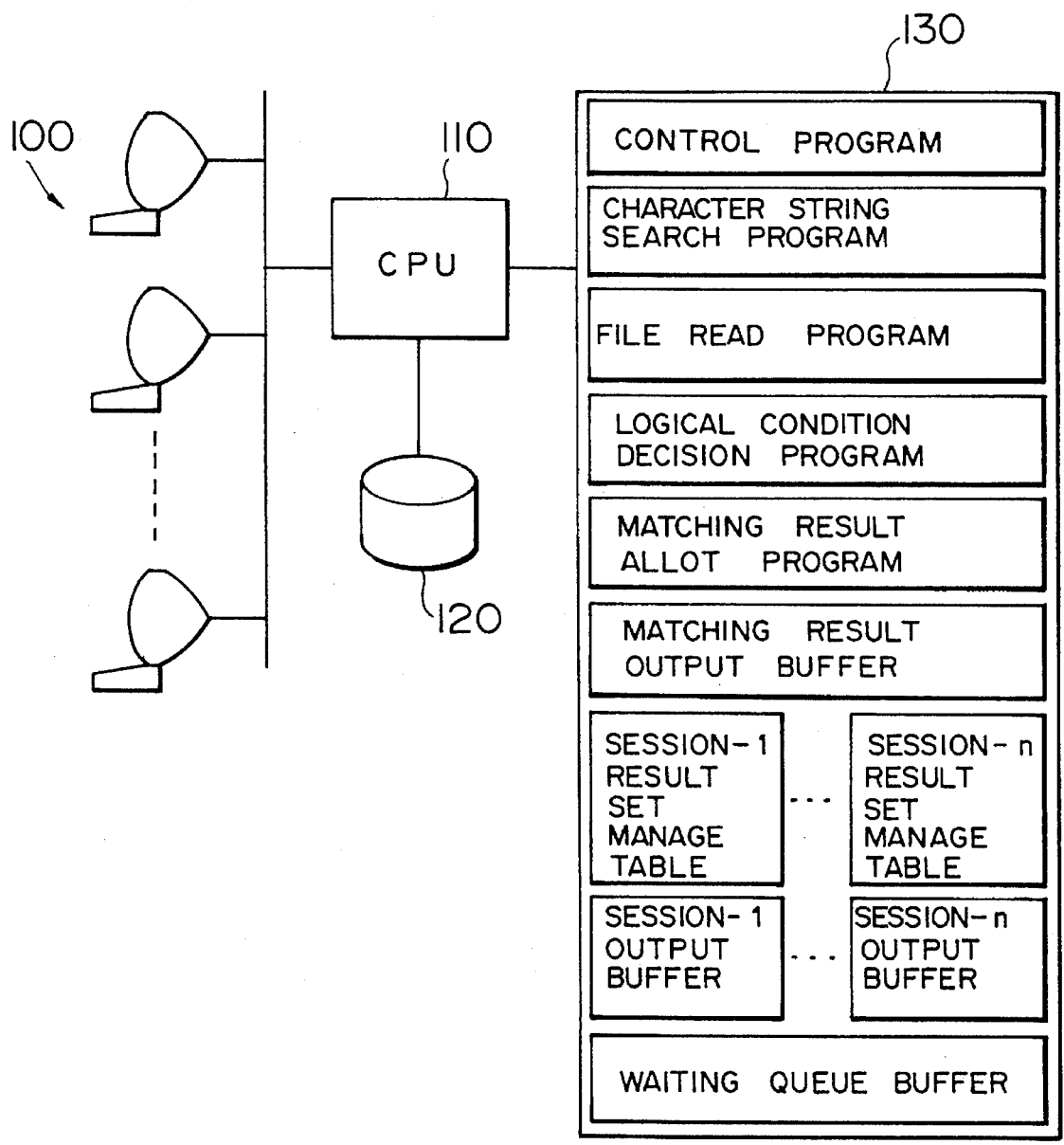
FIG. 5 is a diagram showing schematically a general arrangement of a document information retrieval system according to a first embodiment of the present invention.

FIG. 5 is a diagram showing schematically a general arrangement of a document information retrieval system according to an embodiment of the present invention. As can be seen in the figure, the system comprises a plurality of search terminals 100, a CPU (Central Processing Unit) 110, a magnetic disk device 120 storing a database, and a memory 130 for storing a variety of programs and various data buffers. More specifically, the memory 130 stores therein a control program for controlling the search/retrieval processing as a whole, a character string search program for searching and retrieving a specific character string from the database, a file read program for reading out data from the magnetic disk device to send the data to the character search program, a logical condition decision program for making "AND" and "OR" decisions between the retrieved character strings as outputted from the character string search program, and a matching result allotting program for sending out the results of search distributively to a plurality of search request sources in case the search requests are issued from a plurality of terminals. Each of the search request sources may be incorporated in each of the individual search terminals, respectively, or alternatively an arbitrary number of search request sources may be provided in each search terminal. Additionally, the memory 130 includes a matching result output buffer for storing temporarily the results of the character string search as well as the result of the logical condition decision, session-n output buffers for storing and managing sets of search results in the past for the individual search request sources, respectively, session-n output buffers for outputting the results of the search to the individual search request sources, and a waiting queue buffer for storing temporarily the search requests when they are simultaneously issued from a plurality of terminals.

In the following, the processings executed by the programs mentioned above will be elucidated in detail by following a flow of search/retrieval processings.

Figure 6:
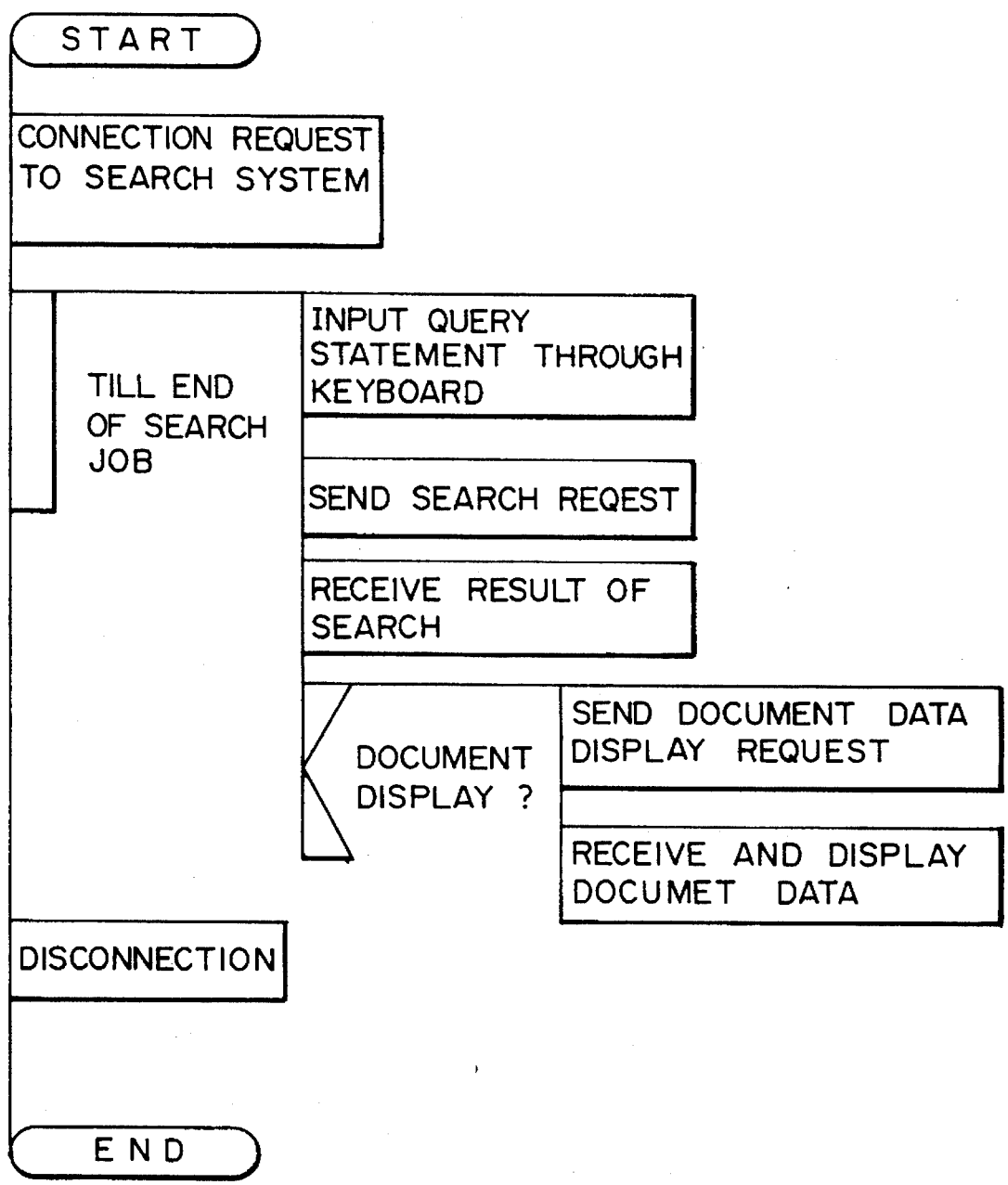
FIG. 6 is a PAD diagram showing a flow of jobs executed by a terminal in the system according to the first embodiment of the invention.

At first, description is directed to a flow of search processing executed at the side of the terminal. FIG. 6 is a PAD diagram (Program Analysis Diagram) showing a flow of jobs executed by a terminal in the system according to the instant embodiment of the invention. According to the teachings of the invention incarnated in the instant embodiment, a connection request for connecting the search terminal of concern to the search system is first processed. Thereafter, a query statement (condition for the search, to say in another way) is inputted by the user of the terminal. Subsequently, the search request is sent to the system. Finally, the terminal receives the result of the search from the system. When occasion requires, the terminal may acquire relevant document data from the search system in dependence on the result of the search as received from the system. After the above-mentioned jobs involved in the search have been completed, the connection between the terminal and the search or host system can be removed.

Figure 7:
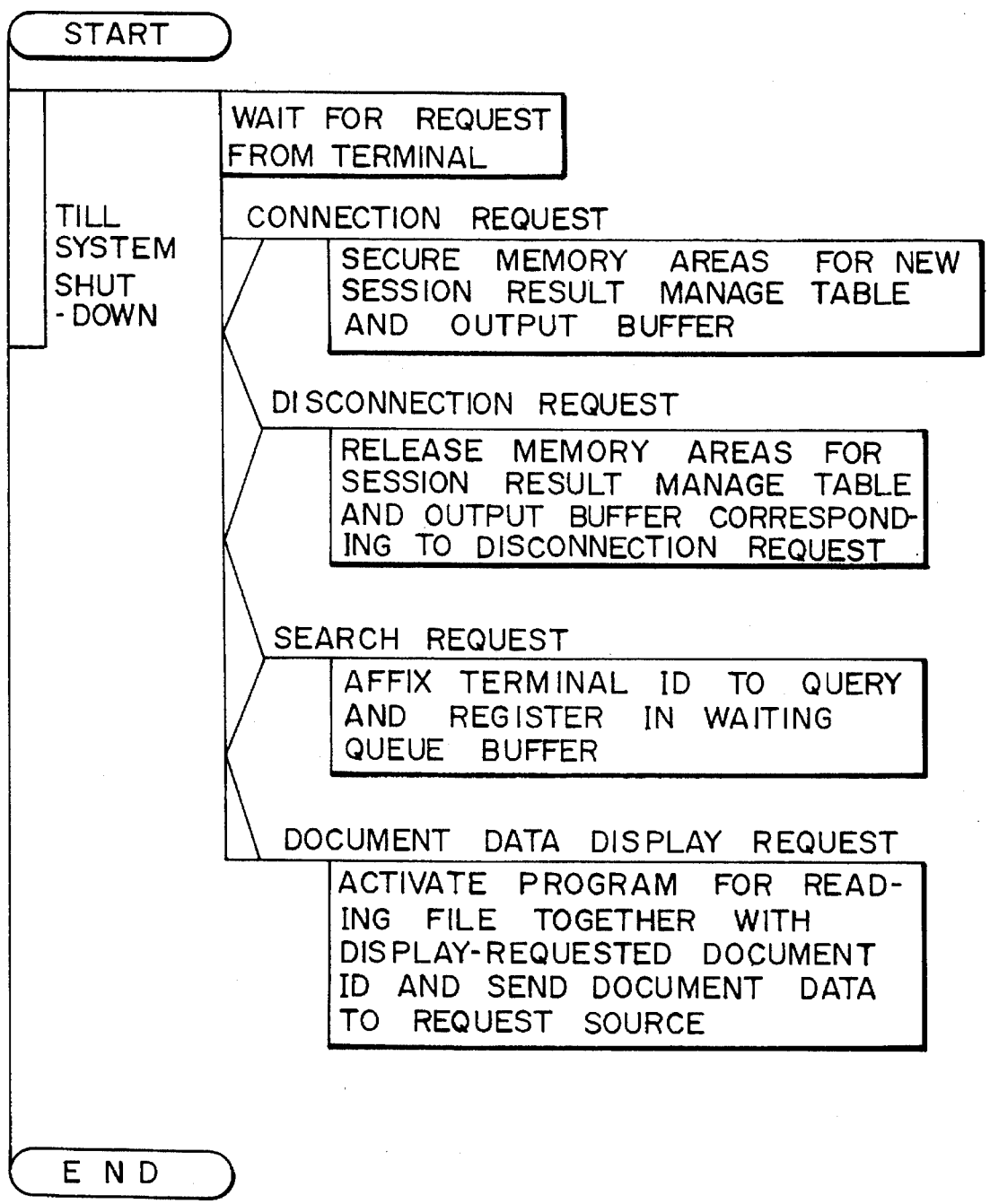
FIG. 7 is a PAD diagram showing processings executed by a control program in the search system.

FIG. 7 is a PAD diagram showing in summary processings executed by the control program of the host shown in FIG. 5.

Upon reception of the connection request from the terminal, the control program secures memory areas for a session-n result set manage table and the session-n output buffer on the memory 130 (FIG. 5). The symbol n represents one of serial numbers ranging from 1 to n, which is updated for the terminal issued the connection request (or for a plurality of search request sources installed in that terminal). This number will hereinafter be referred to as the terminal identifier. At this juncture, it is supposed that the connection requests have already been received from two terminals and that a connection request is newly issued from a third one of the terminals. In that case, the identifier of the third terminal is set to "3". Accordingly, the control program secures the memory areas for the session-3 result set manage table and the session-3 output buffer, respectively.

On the other hand, when disconnection request is issued, the memory areas for the result set manage table and the output buffer corresponding to the identifier of the terminal which issued the disconnection request are cleared or released.

In case the display request for the document data as searched or retrieved is received, an instruction for reading the document data as requested from a file is set by the file read program (FIG. 5), whereon the document data outputted to the session-n output buffer by the file read program is sent to the search request source by the control program.

As one of the processings executed by the control program, description will now turn to the details of a processing which is performed upon reception of a search request from a terminal according to the teachings of the present invention.

Figure 8:
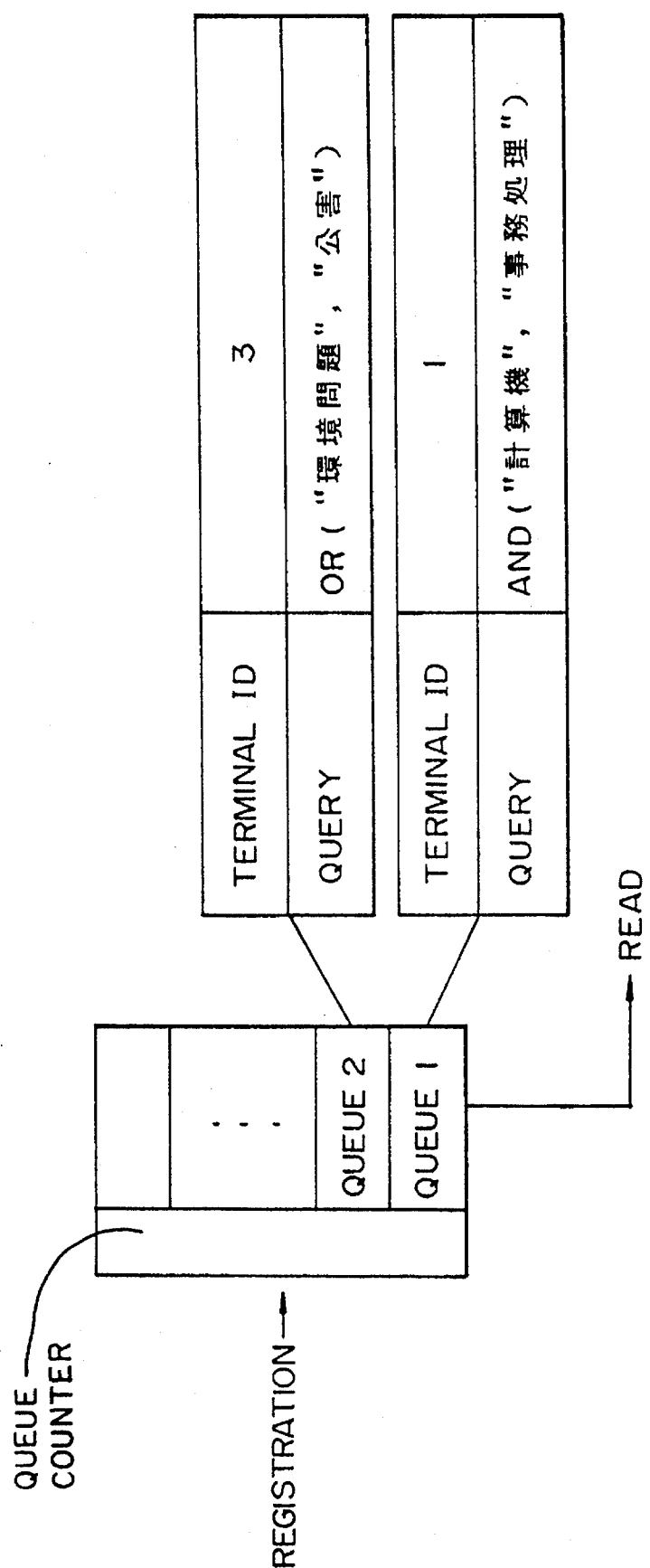
FIG. 8 is a conceptional view showing a structure of a waiting queue buffer employed in the search system.

When a search request is accepted, the control program generates or creates newly a waiting queue, which is then stacked on the queue buffer. More specifically, the queue buffer is of a stack structure in which pairs each of a terminal identifier and a query statement (condition for search) are stacked up, as shown in FIG. 8. Every time one queue is stacked, the count of a queue counter is incremented. The character string search program which will be described in detail hereinafter fetches the search request from the queue buffer to thereby perform the search processing in accordance with the query or condition for search, the result of which is furnished to the search request source. In this manner, the control program performs the processing for stacking the search requests in the queue buffer while the character string search program executes the processing for taking out the search request from the queue buffer. When the control program accepts the search requests sequentially while the character string search processing for a search request is being executed, the waiting queues (i.e., queues awaiting the processing) are stacked up increasingly in the queue buffer.

Next, description will be made of the character string search processing on the assumption that the character string search program operates in a time sharing mode with the control programs described previously. More specifically, the control program serves to monitor the arrival of the search request(s) from the terminal(s) while the character string search program is waiting for the queue stacked by the control program. When a search request is placed in the queue buffer, the character string search program starts execution of the search processing. In the course of execution of the search processing, the queue buffer is not referenced. Accordingly, when the search requests arrive at the system sequentially, the search requests are successively accumulated within the queue buffer. The search requests stacked in this manner are processed after completion of the current execution of the search processing performed by the character string search program.

Figure 9:
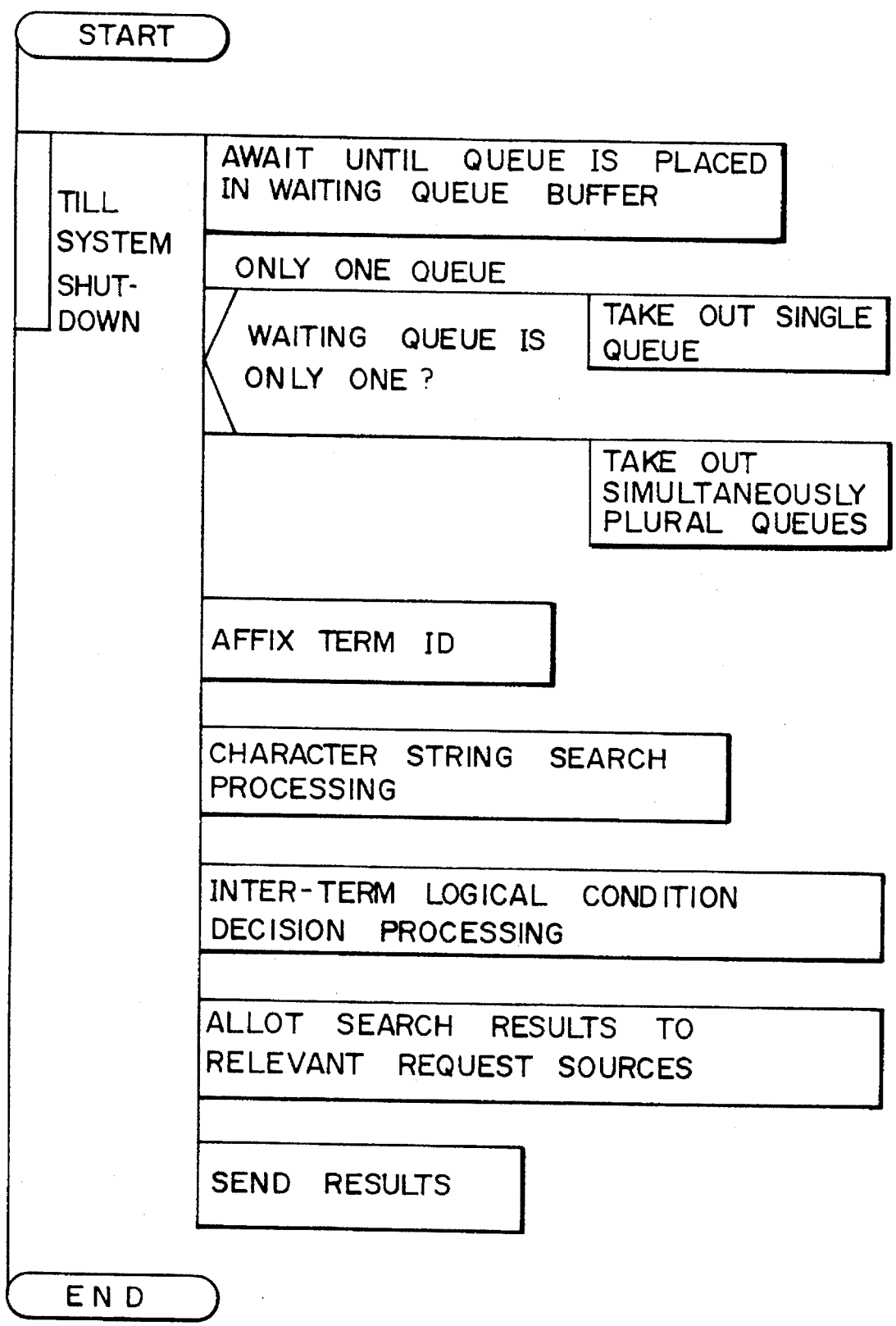
FIG. 9 is a PAD diagram illustrating a flow of processings performed by a character string search program.

FIG. 9 is a PAD diagram illustrating a flow of processings performed by the character string search program. In the initial state, the character string search program is waiting for arrival of a search request(s). When the search request is received, the search processing is executed. In this connection, it should be noted that the character string search program checks the number of the search requests stacked within the queue buffer, and when a plurality of search requests are found as waiting for processing in the queue buffer, these search requests are simultaneously taken out from the queue buffer and then search processing are executed en bloc (i.e., simultaneously). If the search request is single, then a search processing according to the single search request is executed without waiting for the en bloc processing. To this end, the query statement of the search request(s) awaiting in the queue is analyzed to allocate a term identifier (hereinafter also referred to as the term ID) to a search term. The succeeding processing is executed by using these term IDs. More specifically, when relevant search terms are found in a text through the character string search processing, the term IDs allocated to these search terms are outputted. Of the term IDs outputted, only those which have been decided to satisfy logical condition such as "AND" or "OR" condition between the search terms through an inter-term logical condition decision processing are carried out and inter-term logical conditions are validated. The results of search(es) as obtained finally are distributively supplied or allotted to the relevant source terminals, respectively, whereupon the series of the search processings come to an end. The search system resumes then the state for awaiting issuance of search request(s).

In conjunction with the character string search processing program, description will further be made in detail of the term ID allocating processing, the logical condition decision processing and the allotment processing of the results of search(es) as performed.

Figure 10:
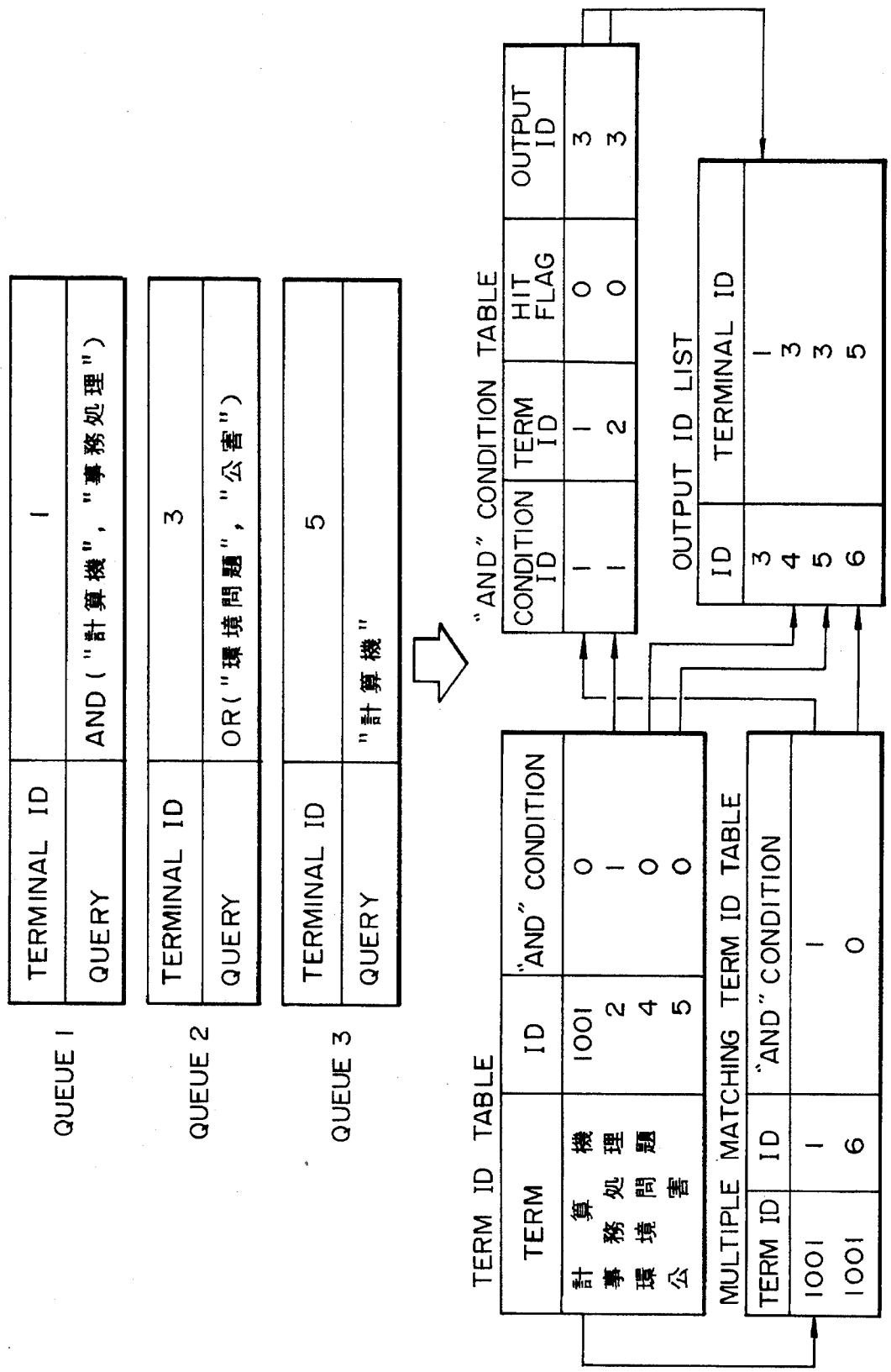
FIG. 10 is a conceptional view showing a term ID allocation processing.

The term ID allocating processing resides primarily in that identification numbers or IDs unique to search terms included in the query statement or statements accumulated in a single or plural queues as shown in FIG. 10 are imparted or allocated to the search terms, respectively. Additionally, with the term ID allocation processing, it is determined if a same search term is used between or among query statements, "AND" condition is fulfilled between search terms, and in which terminal's search requests the search terms of concern is included. Through the term ID allocation processing, the search requests each including the terminal identifier and the query statement are processed to thereby generate four tables or lists, i.e., a term ID table, a multiple matching term ID table, an AND condition decision table and an output ID list, as is shown in FIG. 10.

The term ID table contains the term IDs which correspond to the actual character strings, respectively. In that case, when the AND condition is required between the terms, the condition IDs contained in the AND condition decision table described hereinafter are registered in the column labeled "AND CONDITION" of the term ID table. The condition IDs are represented by serial integral values starting from "1".

The processing for registration in the term ID table is performed for every search request. In that case, the search character strings designated in each search request are allocated with the ID numbers unique to the character strings, respectively. In the case of the example illustrated in FIG. 10, the search character string "計算機(computer)"

contained in the query statement of the queue 1 is affixed with the term ID of "1", while the search term "事務処理(business transaction)" is affixed with the term ID of "2". In the similar manner, the ID numbers unique to the search terms are sequentially or serially attached to them upon registration thereof.

In conjunction with the registration of the term IDs in the term ID table, the character string which has already been designated as the search term in the other query statement is assigned with a peculiar term ID which is referred to as a multiple matching term ID for registration in the term ID table. By way of example, in the case of the queue 3 shown in FIG. 10, the character string "計算機(computer)" is assigned with the multiple matching term ID which assumes an integral value, starting from "1001" inclusive. There are registered in the multiple matching term ID table the term IDs for two search cases. More specifically, referring again to FIG. 10, the term ID of "1" representing "計算機(computer)" which has originally been registered in the term ID table is replaced by the multiple matching term ID of "1001" for registration in the multiple matching term ID table together with the term IDs of "1" and "6" for two search cases, respectively. When the character string affixed with the multiple matching term ID is hit in the course of the search, the multiple matching ID table is consulted, to thereby output as the result of the search a plurality of term IDs registered in that table. In the case of the example shown in FIG. 10, when a character string "計算機(computer)" is found in a document, the term ID of "1001" is outputted. Since this term ID is a multiple matching term ID, the multiple matching term ID table is consulted, whereupon two term IDs of "1" and "6" are outputted ultimately.

The AND condition table is adapted to register therein the AND condition found between the search terms. For example, upon processing of the search request of the queue 1 shown in FIG. 10, the term IDs of "1001" and "2"as well as the search terms "計算機(computer)" and "事務処理(business transaction)" are registered in the term ID table, while the condition ID of "1" is registered in the AND condition table.

The condition ID is also represented by a unique integer value starting from "1". The AND condition table is so configured as to register therein the output ID in addition to the condition ID and the term ID. The output ID is also a unique number which includes the term IDs. For example, in the case of the processing of the queue 1 shown in FIG. 10, there are two term IDs of "1" and "2". Accordingly, the corresponding output ID registered in the AND condition table is "3". In this conjunction, it should be noted that since the output ID number of "3" is used, as mentioned above, the term ID assigned to the search "環境問題(environmental problem)" in the processing of the queue 2 is "4".

As shown in FIG. 10, the AND condition table has as the items the term ID for the terms having the AND condition, the hit flag indicating that the term is found in the document and the output ID which is outputted when the AND condition is satisfied. The hit flag is initialized to "0" and assumes "1" when the term matching or coinciding with the search term is found in the document. When all the flags assume "1" for one condition ID, the output ID is outputted. Further, the hit flag is reset to "0" on a document-by-document basis. In the case of the examples shown in FIG. 10, when both the character strings "計算機(computer)" (whose term ID assumes value of "1" and "6" because it is a multiple matching search term) and "事務処理(business transaction)" whose term ID is "2"are found in a document, the output ID of "3" is outputted because all the hit flags for the condition ID of "1" are set to "1".

The output ID list registers therein the terms ID or the query statement ID to be outputted as the final result of the search. Any IDs which are not registered in this output ID list are not outputted as the result of the search or retrieval. Further, in this list, there are established correspondences between the output IDs to be outputted simultaneously and the identifiers of the terminals issued the search terms or the query statements so that the search result allotting program can distributively supply the search results to the output buffers for the relevant or proper terminals on the basis of the correspondence information.

Figure 11:
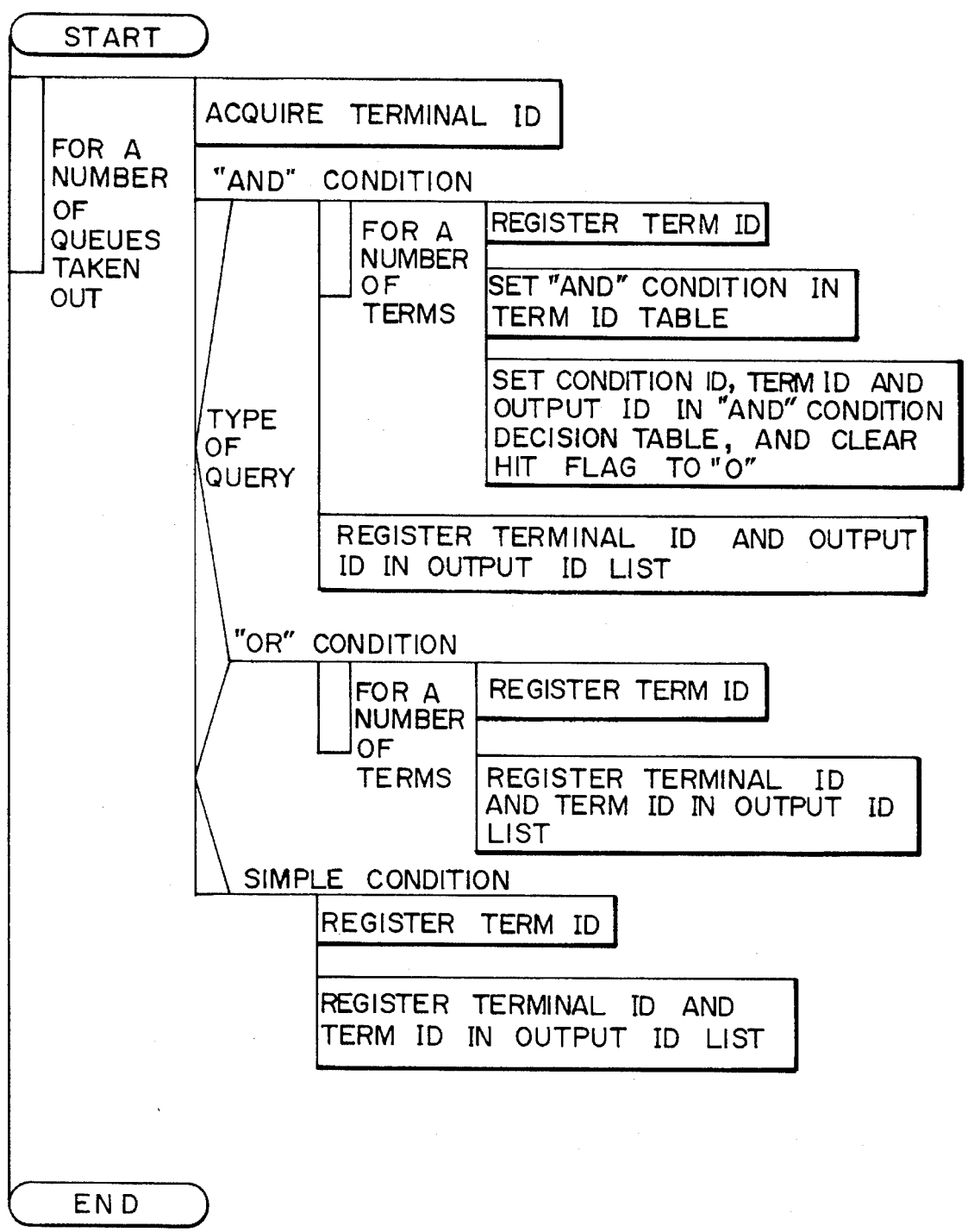
FIG. 11 is a PAD diagram showing a term ID allocation processing.

Now, description will be made in detail of algorithm underlying the term ID allocation processing outlined above, by reference to a PAD diagram of FIG. 11. As shown in this figure, the term ID allocation processing is repeated for a number of times which is equal to the number of the search requests fetched from the waiting queue buffers. At first, the identifier of the terminal which issued the search request is fetched from the queue. Subsequently, processing is performed in accordance with the type of the query statement. With the phrase "type of the query statement", it is intended to mean the type of logical condition on the basis of which the search terms in a query statement are interconnected. In the case of the embodiment now under consideration, it is assumed, only by way of example, that logical AND condition and logical OR condition between a plurality of search terms and a simplified condition in which single search term is given are of concern. In the case of the query statement of the AND condition type, there are performed registration of the term IDs for the search terms included in the query statement, as described hereinafter, setting of the AND condition ID in the term ID table as well as the setting of the AND condition table, whereon the relevant terminal identifier and the output ID are registered in the output ID list. On the other hand, when the query statement requiring satisfaction of the OR condition is of concern, the term IDs of the search terms included in the query statement are registered in the term ID table, whereon the term IDs are registered in the output ID list as well together with the identifier of the relevant terminal.

Figure 12:
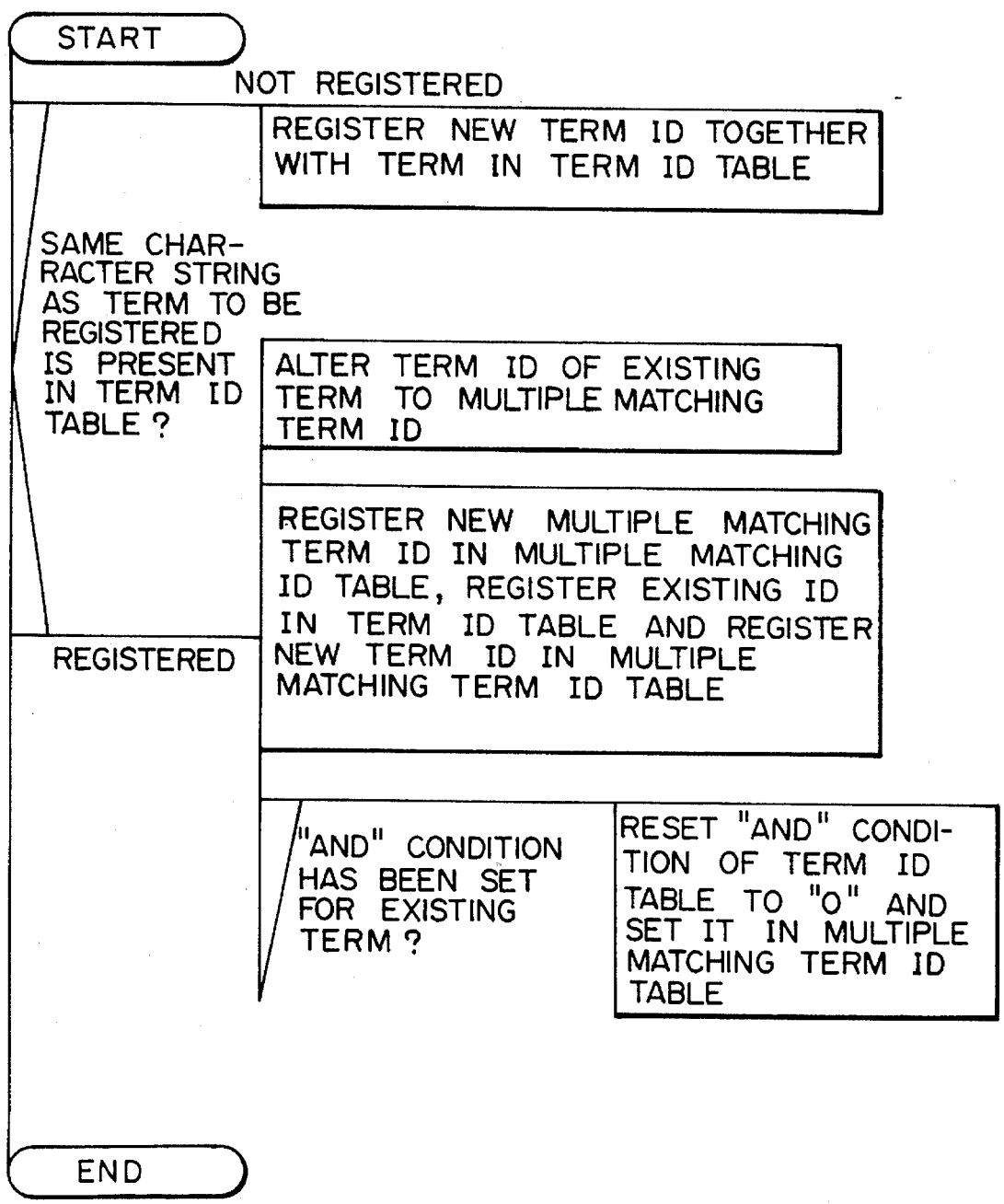
FIG. 12 is a PAD diagram showing a term ID registration processing.

Next, description will turn to the term ID registration algorithm. This processing resides primarily in the registration of the character string of the search term while checking whether or not the character string to be registered has already been registered in the term ID table. When the registration is confirmed, processing for setting the character string in the multiple matching term ID table is performed. For more particulars, reference is made to FIG. 12. As can be seen in this figure, it is checked whether or not a same character string as that of a new search term to be registered has already been registered in the term ID table. If it has not been registered yet, the character string of the new search term is registered in the term ID table together with a new term ID allocated to that character string. On the other hand, when the result of the check mentioned above shows that the same character string exists in the term ID table, the term ID of the existing term or character string is replaced by a corresponding multiple matching term ID, which is then registered in the multiple matching term ID table together with the new term. At that time, however, if the AND condition is set for the existing term, the AND condition ID set in the term ID table is cleared to "0" and registered in the multiple matching term ID table.

In the case of the example illustrated in FIG. 10, the search term "計算機(computer)" is initially registered in the term ID table together with the AND condition ID. However, upon execution of the queue 3, the term ID of "1" is changed to the multiple matching term ID of "1001" and at the same time the AND condition ID of "1" is newly set in the multiple matching term ID table.

Finally, description will turn to details of the search result allotting processing.

Figure 13:
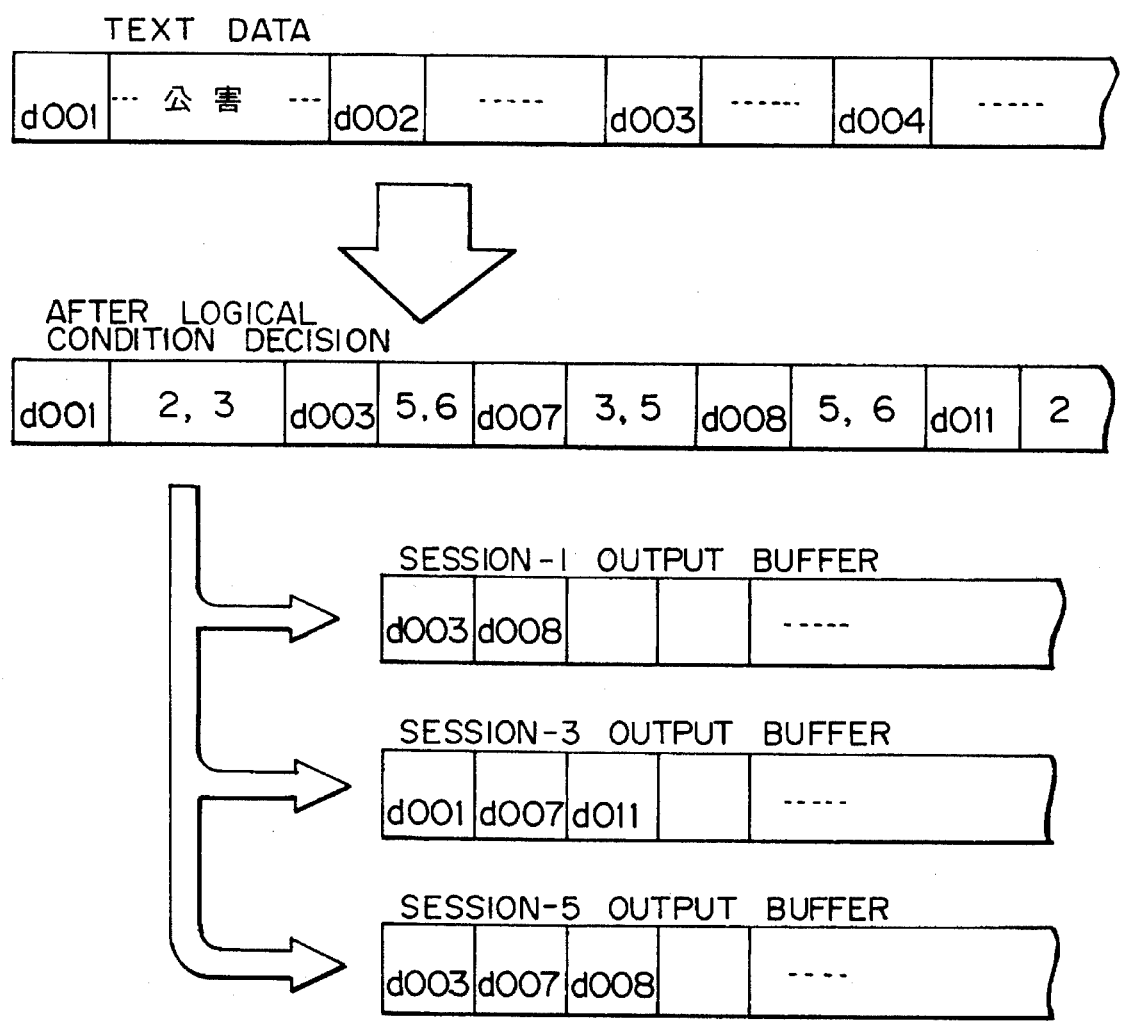
FIG. 13 is a conceptional diagram for illustrating a search result allotment processing.

FIG. 13 is a diagram showing a structure of text data, a structure of data resulting from the logical condition decision processing and structures of data stored in the session-n output buffers. In the text data, there are included a concatenation of plural documents with document IDs denoted generally by "dxxx" being affixed to the start of each of the documents for identifying them, respectively. In the case of the example shown in FIG. 13, the text data having the document IDs of "d001" to "d004" are concatenated. These text data undergo the search term matching processing and the logical condition decision processing, whereby the ID number of the document containing the character strings or search terms satisfying the given logical condition as well as the term IDs of the search terms hit in the search are outputted. At that time, the conditions given by the search request source are all outputted simultaneously. The IDs of the documents found after the logical condition decision processing are distributively placed in the session-n output buffers provided in correspondence to the search request sources, respectively. More specifically, the documents for which the IDs of "2"and "3" are outputted from the logical condition decision processing is stored in the session-3 output buffer, the document for which the ID of "5" is outputted from the logical condition decision processing is stored in the session-5 output buffer, and the document having the ID of "6" is stored in the session-1 output buffer.

Figure 14:
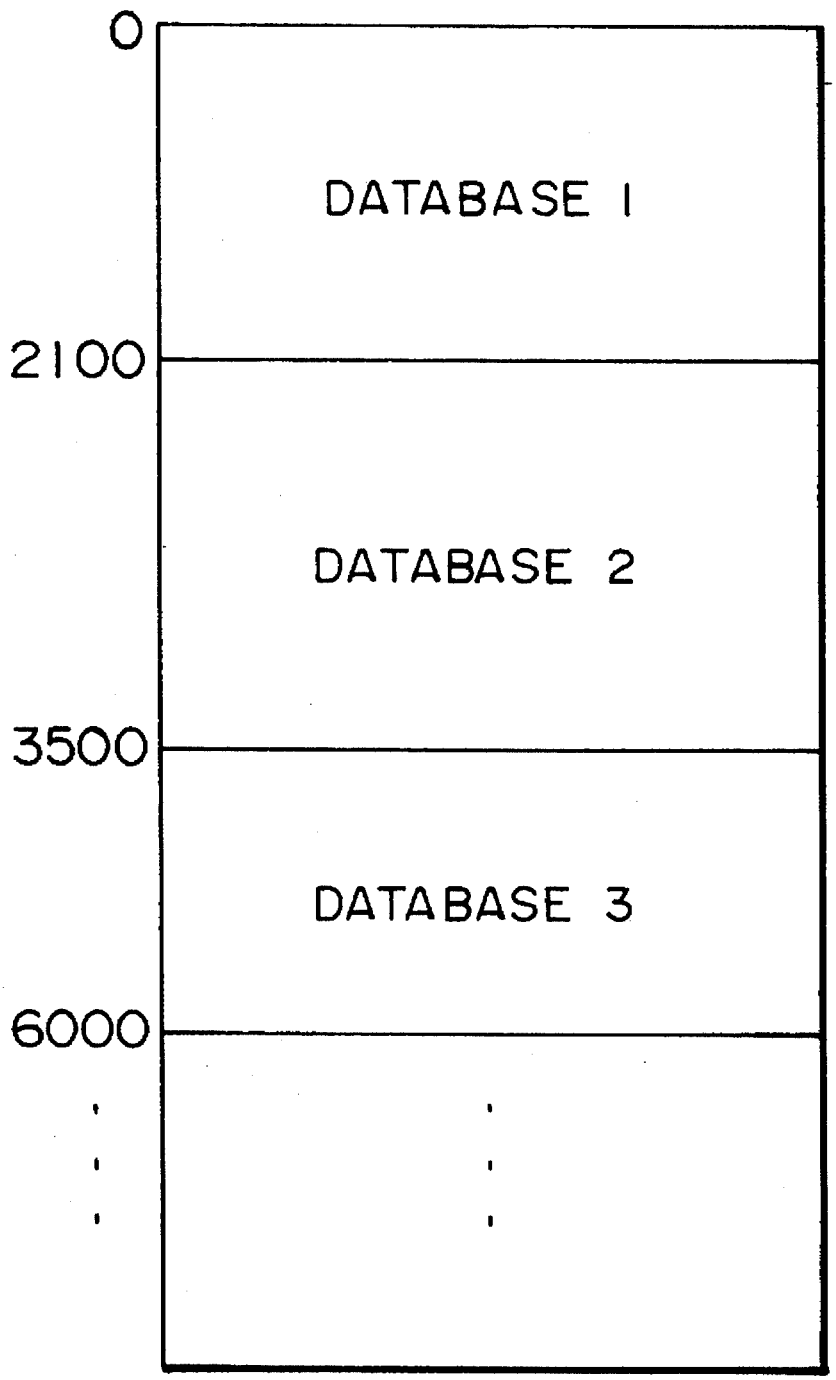
FIG. 14 is a conceptional diagram showing a database storing scheme.

Having described the processings executed by the CPU 110, processings performed when a plurality of databases are stored in the magnetic disk system 120 will be elucidated. As is shown in FIG. 14, data are stored in the magnetic disk 120, being administrated for each of the database.

In the database system storing a plurality of databases as mentioned above, there arises a situation which does not lead to reduction in the time involved in the processing even when the control program processes en bloc the search requests accumulated in the queue buffer, regardless whether or not the search request source issues a search request by designating the database of concern. This holds true particularly when the databases to be accessed differ from one to another search request. By way of example, let's assume that the search request source 1 designates the database 1 as the object for search, while the search request source 2 designating the database 2, wherein the corresponding search requests are accumulated. In that case, even when both the databases 1 and 2 are simultaneously searched en bloc by consolidating together the search requests, overall overhead involved in the scanning remains same as that involved in the search performed separately on the databases. In other words, in the case of the example shown in FIG. 14, overhead involved in scanning the magnetic disk from the logical address of "0" to the address "3500" will remain same regardless of whether the databases 1 and 2 are searched continuously or separately.

On the other hand, in the case where one and the same database 2 is designated by both the search request sources 1 and 2, overhead involved in the scanning can be reduced by a half through the en-bloc search processing by consolidating the search requests when compared with the case mentioned just above. More specifically, when both the search requests are processed separately one by one, the logical addresses "2100" to "3500" are scanned twice. In contrast, when the search request are processed in consolidation or unification, the search processing can be completed through a single scanning operation from "2100" to "3500".

In this manner, in the data search system equipped with a storage which stores a plurality of databases, it is preferred to process en bloc those search requests which have a same range of search or search condition by taking into consideration the databases to be subject to the searches designated by the search requests, because overhead for the scanning can significantly be decreased, to thereby allow the processing to be realized with a shortened waiting time.

Figure 15:
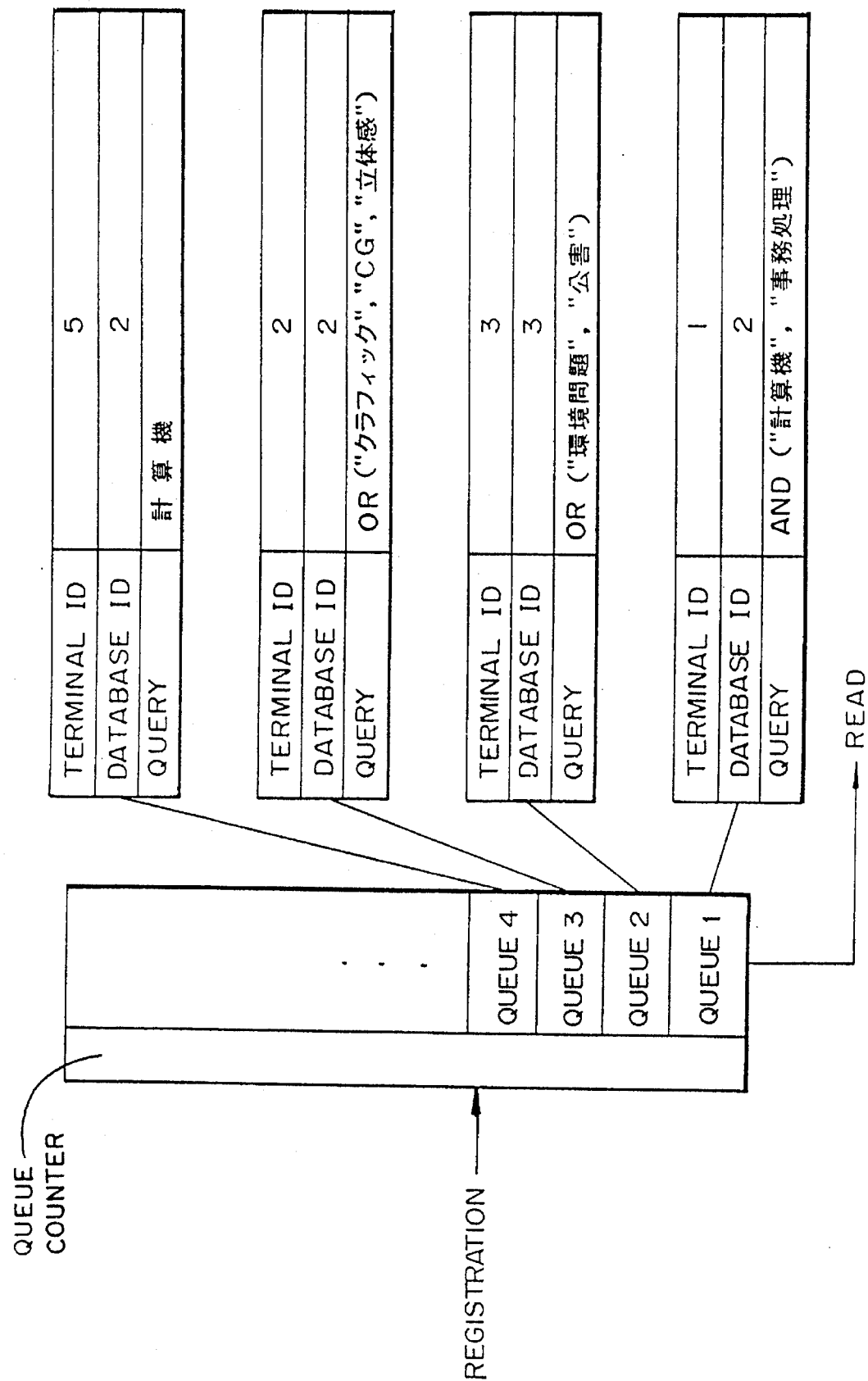
FIG. 15 is a conceptional diagram showing a structure of a waiting queue buffer.

To this end, it is taught according to another aspect of the present invention that when search requests are sent from the individual search terminals or search request sources to the search system, the database identifiers or IDs for identifying the databases which are designated as the objects for the search by the search requests are also stored in the queue. A structure of a queue buffer used for this purpose is shown in FIG. 15. As can be seen in this figure, the terminal identifier, the database ID and the query statement are stored in the queue. When the search processing is performed consolidatedly by taking out the search requests accumulated in the queue buffer, only those search requests which have the same database ID are selected to perform the en-bloc search processing which can ensure a high efficiency, as described above.

Figure 16:
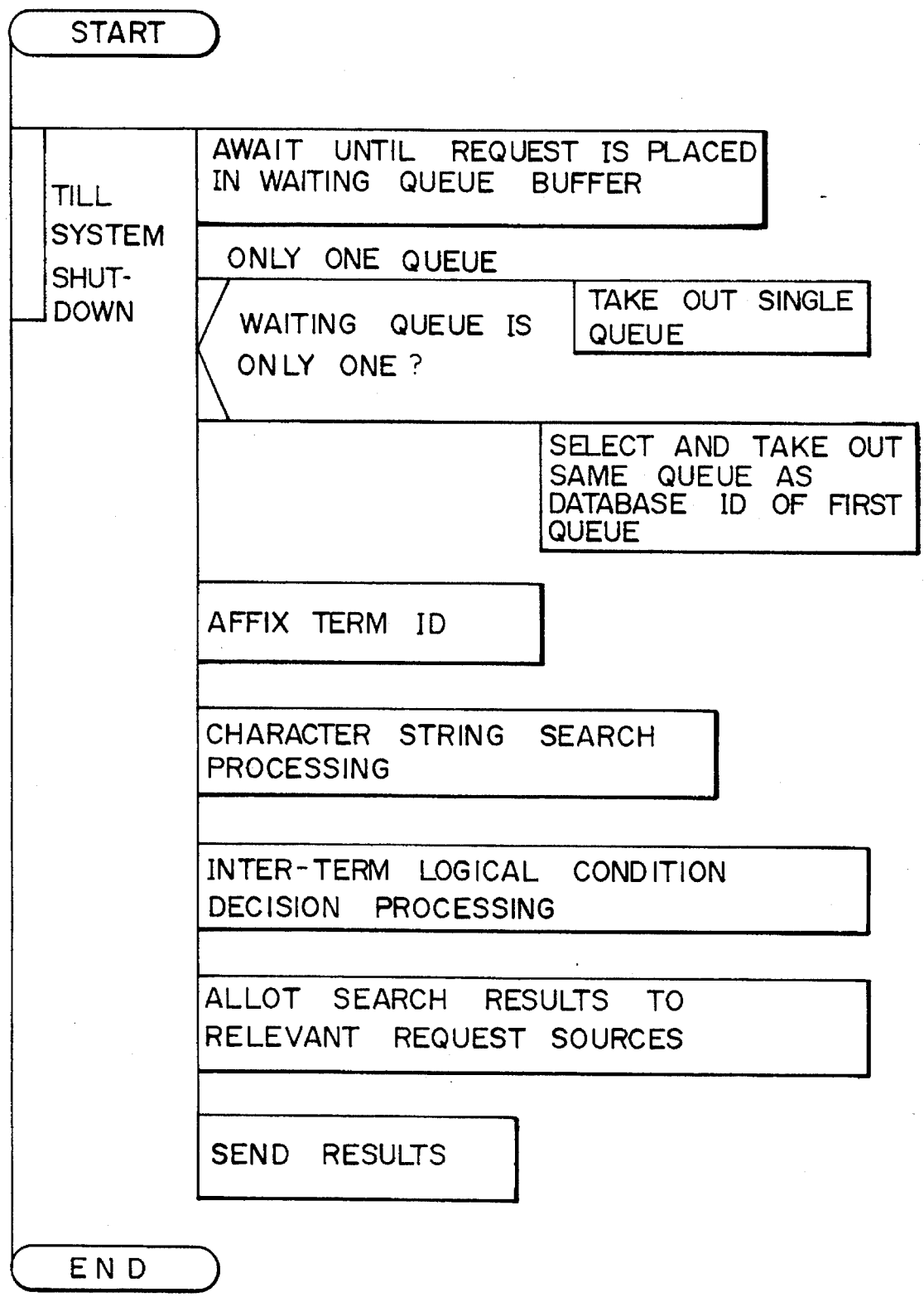
FIG. 16 is a PAD diagram showing processings performed by a character string search program in the case where a plurality of databases are provided.

The search processing performed by selecting the database will be explained in concrete. FIG. 16 is a PAD diagram showing processings performed by the character string search program described hereinbefore in conjunction with FIG. 9 when there exist a plurality of databases. Difference in the processing in this case is found only in the method of taking out the queue from the queue buffer. Accordingly, the following description will be made by putting importance to the difference while omitting repeated description concerning the same or similar processings as those described hereinbefore.

It is now assumed that the search requests are stacked in the queue buffer in the manner shown in FIG. 15. In that case, the queue 1 is first taken out from the buffer and the database ID contained in the queue 1 is checked, whereon only the queues sharing the same database are fetched from the queue buffer. In the case of the example shown in FIG. 15, the queue 1 indicates the search to be performed on the database whose identifier ID is "2". Accordingly, the queues 3 and 4 are taken out with only the queue 2 being left in the buffer, whereon the search requests indicated by the queues 1, 3 and 4 are consolidatedly subjected to the en-bloc processing. In this manner, only the database having the ID of "2"is scanned for the searches requested by the queues 1, 3 and 4, the results of the search being allotted to the terminals having the terminal IDs of "1", "2"and "5", respectively, whereupon the search processing comes to an end. At this time point, there still remains the queue 2 in the queue buffer. Accordingly, this queue 2 is fetched from the queue buffer, whereon the search indicated by this queue 2 is performed on the database 3.

As can be understood from the above description, even a plurality of search requests issued to a plurality of databases can be processed en bloc, and thus there has been provided a data search/retrieval system in which the time taken for awaiting the result of the search can remarkably be reduced.

Figure 17:
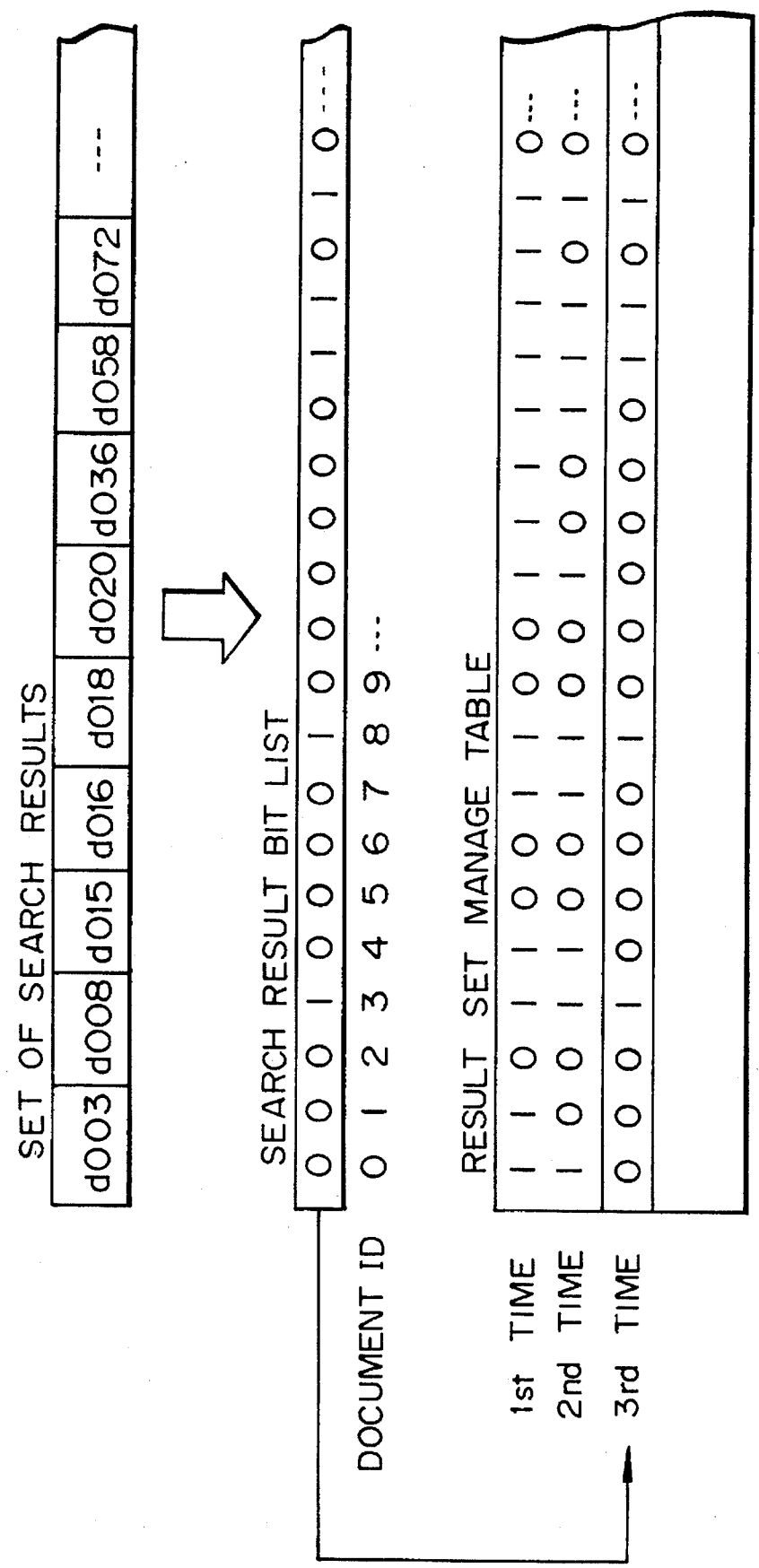
FIG. 17 is a conceptional diagram for illustrating a method of storing results of search.

In the above, the character string search processing for a single search request and the search processing for a plurality of search requests have been described. A set of documents obtained as a result of the search is stored in such a manner as illustrated in FIG. 17 to be subsequently used as a database set in succeeding document search or ORing operation between the document sets. In the case of the example shown in FIG. 17, a row of document IDs in a set of the search results is represented in the form of a search result bit list in which "1"s are placed at positions for the document IDs for which documents are hit while "0"s are placed at positions of the document IDs for which no document are hit, respectively. The representation of the set of the search results in the form of the bit list can bring about an advantage that ANDing and ORing operation processings between the document sets can be realized by inter-bit ANDing or ORing operation. A result set management table is employed for storing for management a number of bit lists which corresponds to the number of times the search has been performed. A plurality of such result set management tables are provided in correspondence to the number of the terminals as connected, respectively, wherein each of the tables stores a set of results of the searches performed in response to requests issued by the associated terminal.

The following description will be directed to a hierarchical search processing in which the search result set management tables are used.

Figure 18:
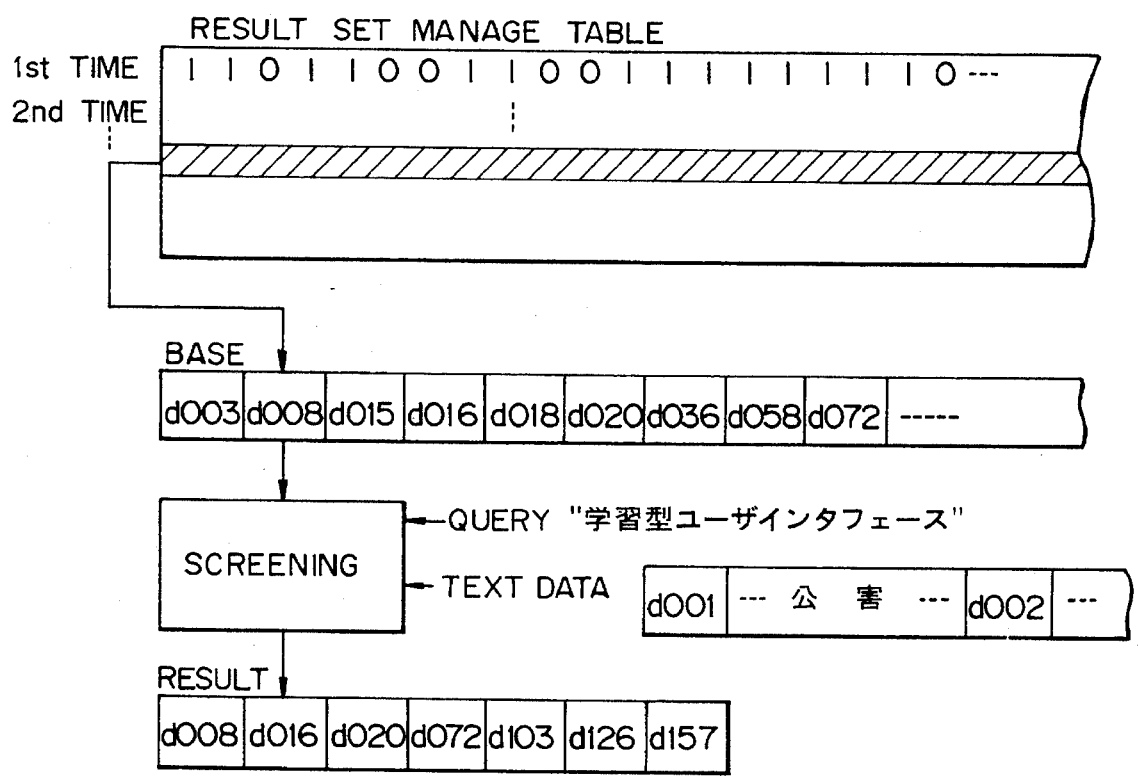
FIG. 18 is a conceptional diagram for illustrating the principle of a hierarchical search.

With the hierarchical search, it is intended to mean the search processing in which the set of the results of the searches performed in the past and managed by the search result set management table are subjected to the search, as is shown in FIG. 18. This search processing may be referred to as a screening search as well.

More specifically, a row of the document IDs resulting from the search performed in the past (ordinarily resulting from the immediately preceding search) is determined from the bit list of the search result set management table (the row of the document IDs as determined is referred to as the base), whereon search is performed on the text data with a new query ("学習型ユーザインタフェース(learning type user interface)"). At this time, the text data except those of the base are skipped from the reading. In the case of the example shown in FIG. 18, the text data "d001", "d002" and "d004" to "d007" which do not belong to the base in the sense defined above are excluded from the search processing. Namely, the text data "d003", "d008", "d015", etc. are only scanned to find "学習型ユーザインタフェース". And then, the document IDs of "d008", "d016" etc., of the search term specified in the query are found in the text data of the base document. This is what is called the screening processing.

Figure 19:
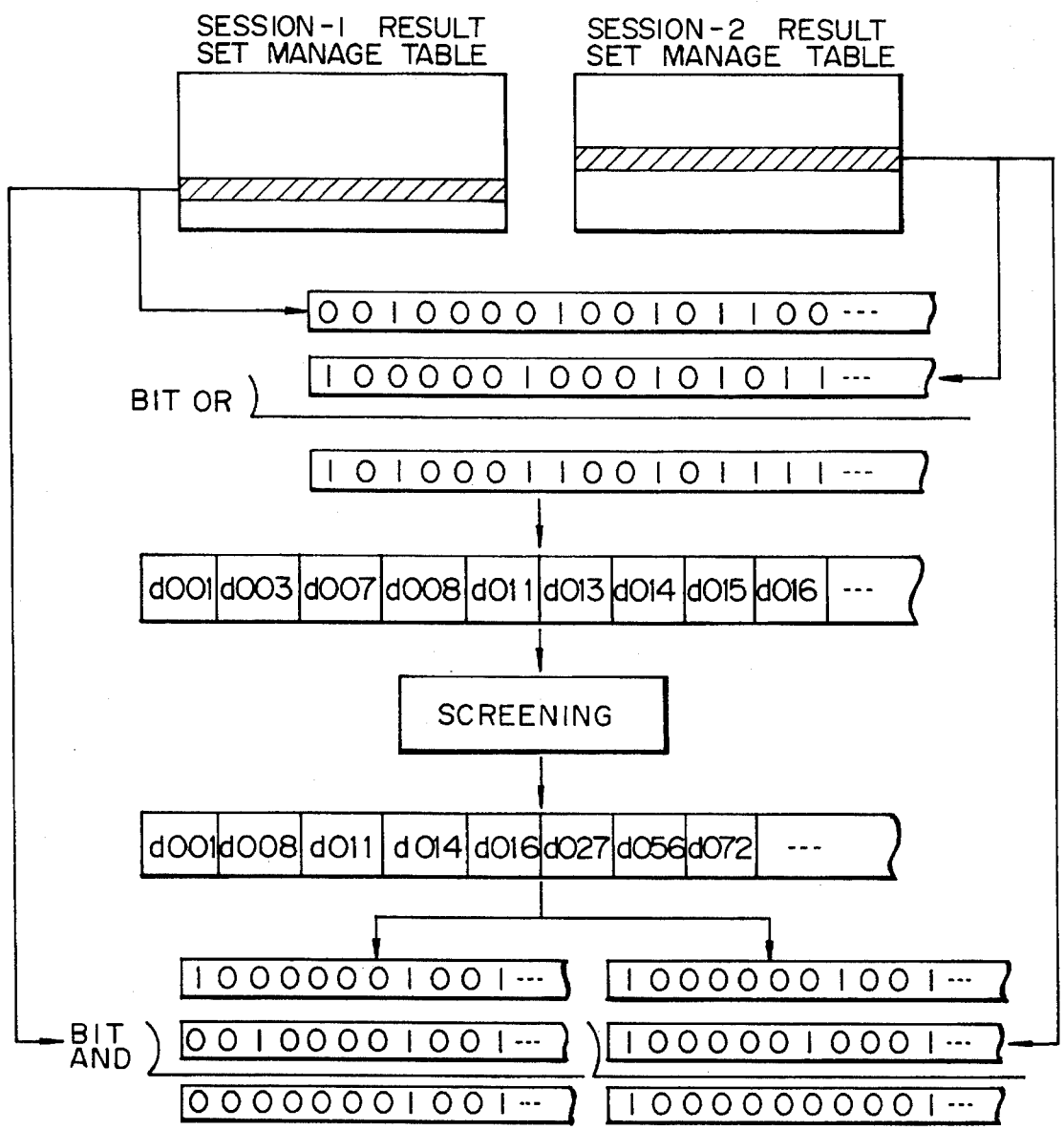
FIG. 19 is a conceptional diagram showing a hierarchical search method carried out when a plurality of search requests are received.

A method of realizing the hierarchical search will be described on the assumption that a plurality of search requests are held cumulatively in the waiting queue buffer. When the search requests differ from one another, the bases naturally becomes different correspondingly. Consequently, there arises a problem as to how to set the bases or how to allot or divide the sets of the results of search. The character string collating or matching operation should preferably be reduced to a possible minimum in view of the fact that scanning of the text data is inevitably required. Under the circumstances, it is proposed that the bases or bit lists are read out from the search result set management table for the individual search request sources and that the result of the bit-based ORing operation performed on the bit lists is used as a base upon reception of a plurality of search requests, as shown in FIG. 19. Subsequently, the result sets obtained after the screening operation are placed again in the bit list, which is then subjected to an AND operation with the base or bit list of each search request sources. This last AND operation is necessary for eliminating the noise generated due to the matching of the query statements in the base of other search request sources.

In the foregoing, the first embodiment of the invention has been described, inclusive of the processing for realizing the hierarchical search function. This embodiment requires no especial hardware and makes it possible to process a plurality of full text search requests with a single CPU, to an advantage.

Next, description will turn to a second embodiment of the present invention, which features a character string search processing realized by resorting to a specific hardware configuration or a plurality of CPUs including the one dedicated only to the search processing.

Figure 20:
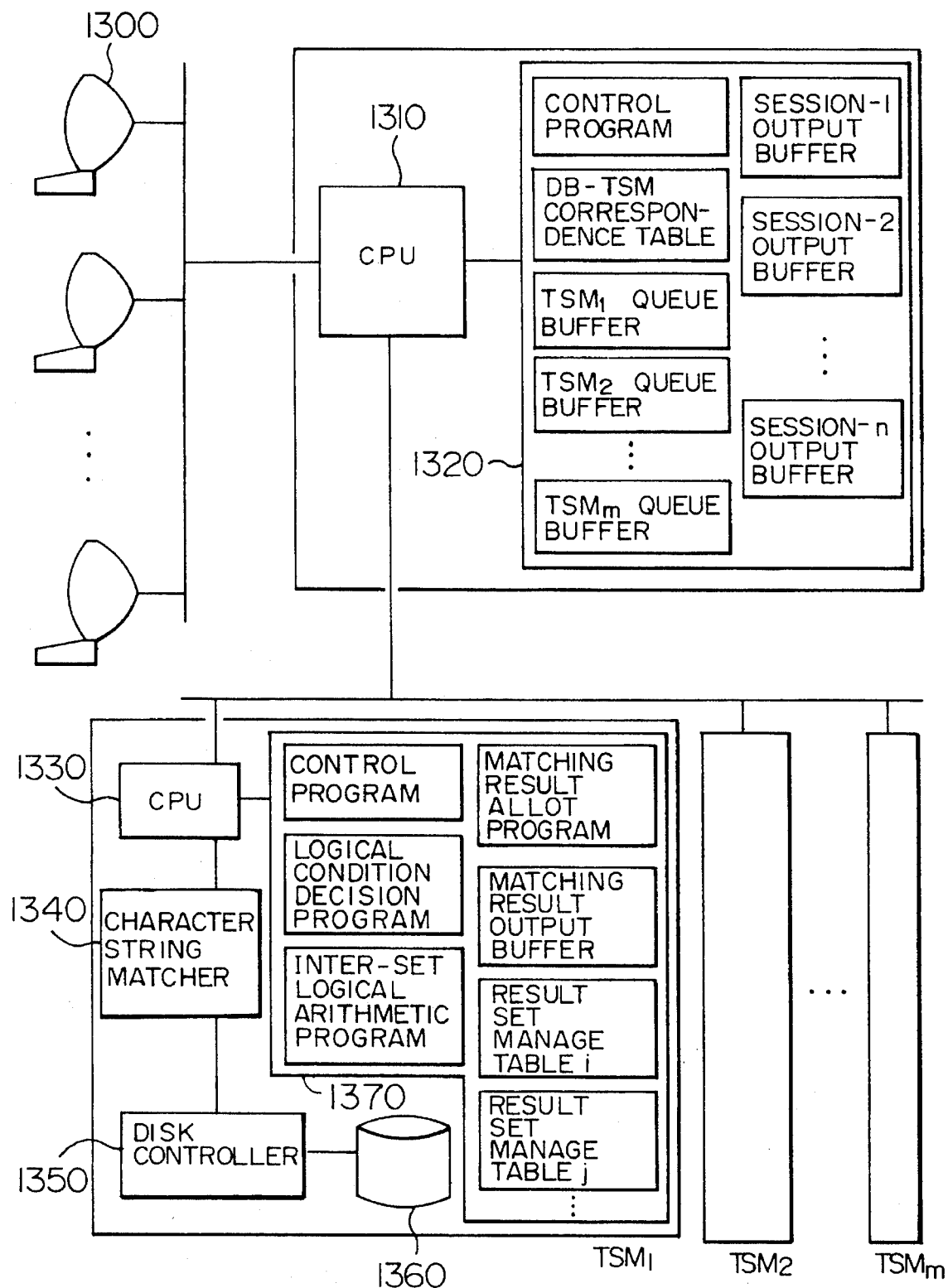
FIG. 20 is a block diagram showing a general arrangement of a document information search system according to a second embodiment of the invention.

FIG. 20 is a block diagram showing a general arrangement of a document information search system according to the second embodiment of the invention. This system is composed of search terminals 1300, a CPU 1310 for executing the search processings, a first memory 1320 storing a control program and a variety of data buffers inclusive of a table, a CPU 1330 connected to the CPU 1310 and destined for controlling the actual character string search processing, a character string matcher 1340 dedicated for executing the character string matching processing, a disk controller 1350 for controlling write/read operations performed on magnetic disk system serving for storing a database, the magnetic disk system 1360, and a second memory 1370 for storing a program to control the character string matching processing and a variety of data areas. The CPU 1330, the character string matcher 1340, the disk controller 1350, the magnetic disk system 1360 and the memory 1370 constitute one processing block referred to as the TSM block. A plurality of TSM (Text Search Machine) blocks $TSM_1$, $TSM_2$, ..., $TSM_m$ are connected to the CPU 1310. The memory 1320 stores control programs for controlling the TSM blocks and the terminals. Further, the first memory 1320 stores a DB-TSM correspondence table for managing the databases included in the individual TSM blocks, queue buffers for the TSM blocks, session-n output buffers for the terminals connected by LAN (Local Area Network) for example. On the other hand, the second memory 1370 stores a control program for controlling execution of the character string processing, a logical condition decision program for making decision as to whether inter-term AND or OR condition is satisfied, and a matching result allotting program for allotting the results of the searches or retrievals performed upon simultaneous reception of search requests from a plurality of terminals. Accordingly, there are secured on the second memory 1370 memory areas for a matching result output buffer for storing temporarily the result of matching and result set management tables for the connected terminals, respectively.

In the following, details of the processes executed by the programs will be described in connection with the flow of search processing.

The flow of the search processing conducted at the side of the terminal is same as in the case of the first embodiment.

Figure 21:
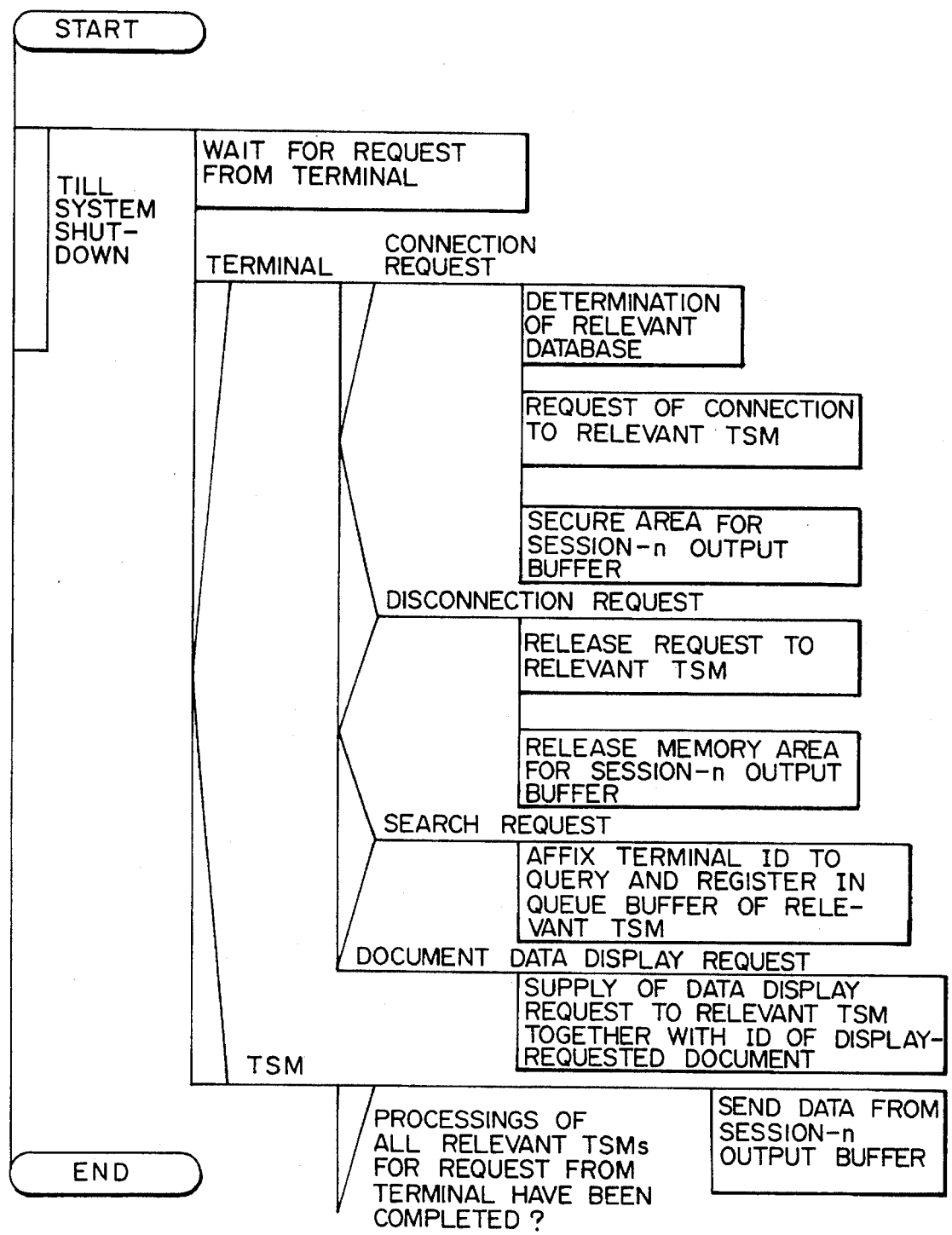
FIG. 21 is a PAD diagram showing a flow of the processings executed by a control program running on an upper rank CPU.

Difference from the latter is seen in the flow of the control program executed by the CPUs 1310 and 1330. Accordingly, the following description will primarily be directed to the processings performed by the control program. FIG. 21 is a PAD diagram showing a flow of the processing executed by the CPU 1310. Referring to this figure, the CPU 1310 waits for a search request or requests from a terminal or terminals for execution thereof. It should however be mentioned that in the case of the instant embodiment, the CPU 1310 is also destined to process a search processing end signal issued from the TSM block as an interrupt. Accordingly, the terminal request processing will first be elucidated, and then the processing performed in response to the search processing end signal from the TSM will be explained.

When a connection request is issued from a terminal, the DB-TSM correspondence table is consulted on the basis of the database to which the search request is oriented, whereon a connection request is issued to the corresponding TSM. Thereafter, the session-n output buffer area is secured on the memory 1320.

For releasing the TSM, a release request is issued to the relevant TSM, whereby the session-n output buffer area secured in response to the TSM connection request is released.

For a search request, the identifier of the terminal issued the search request is registered in the waiting queue buffer incorporated in the corresponding or relevant TSM together with the search request itself.

In case a document data display request is received, a data display request is issued to the corresponding TSM. After the data as requested has been stored in the output buffer, the data is sent out to the search request source terminal which issued the data display request.

Upon reception of the search processing end interrupt from a TSM, decision is made as to whether or not the processings performed by all the TSMs which are in charge of management of the databases designated by the search request source terminal or terminals have been completed. Only when the result of this decision is affirmative (YES), the searched data are sent out from the output buffer. If otherwise, any search processing end interrupt is neglected, and completion of the processings performed by all the TSMs participating in the search processing as required is awaited.

Figure 1:
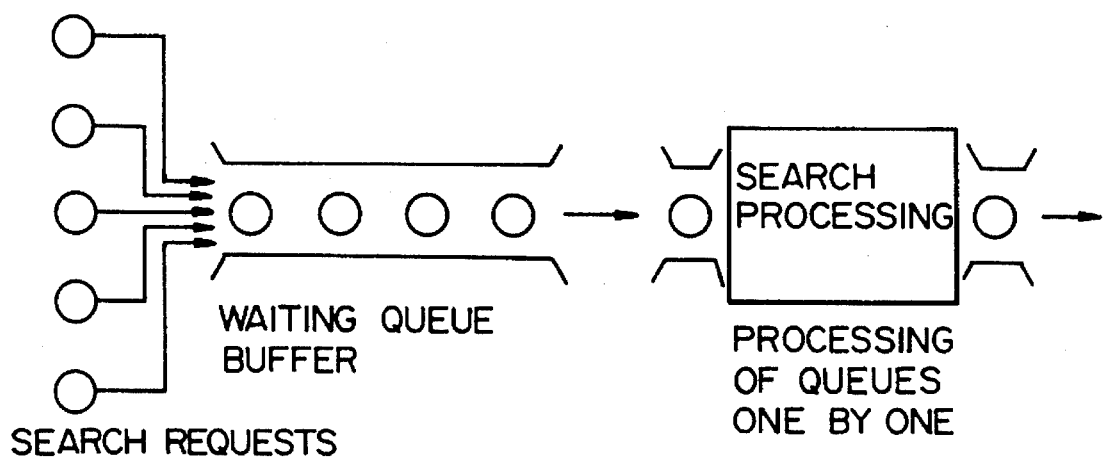
FIG. 1 is a conceptional diagram illustrating a processing for accepting a plurality of search requests by using a queue buffer.
Figure 2:
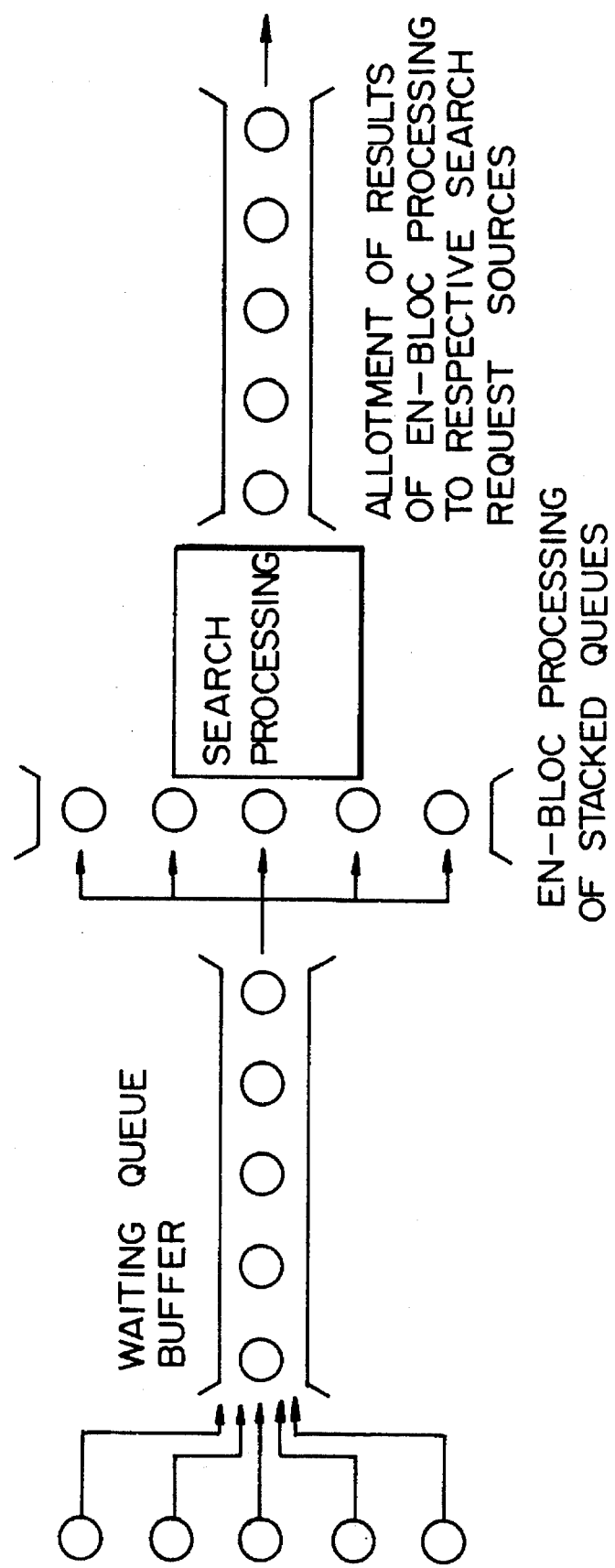
FIG. 2 is a conceptional view for illustrating an en-bloc processing of plural search requests.
Figure 3B:
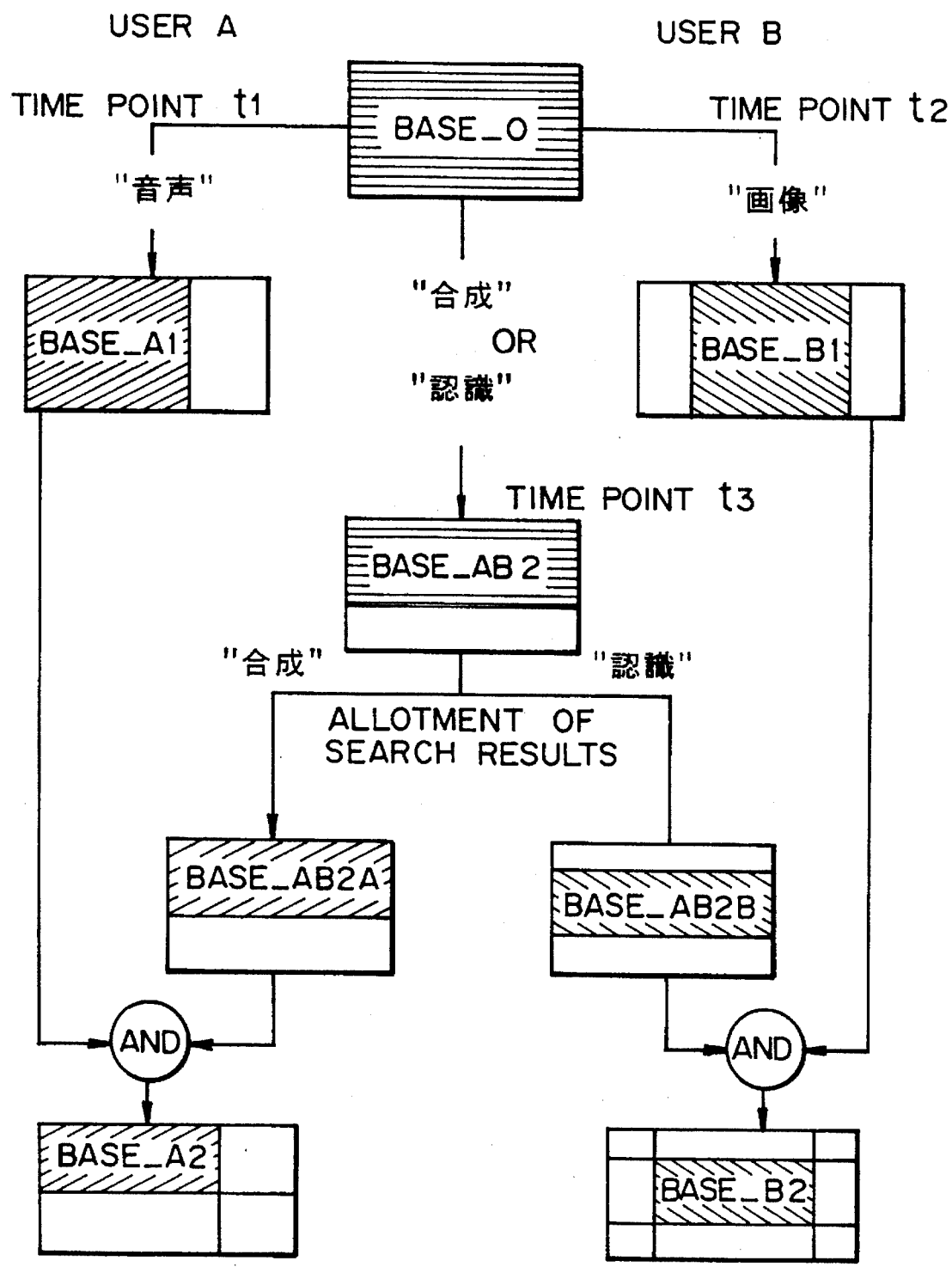
Figure 3C:
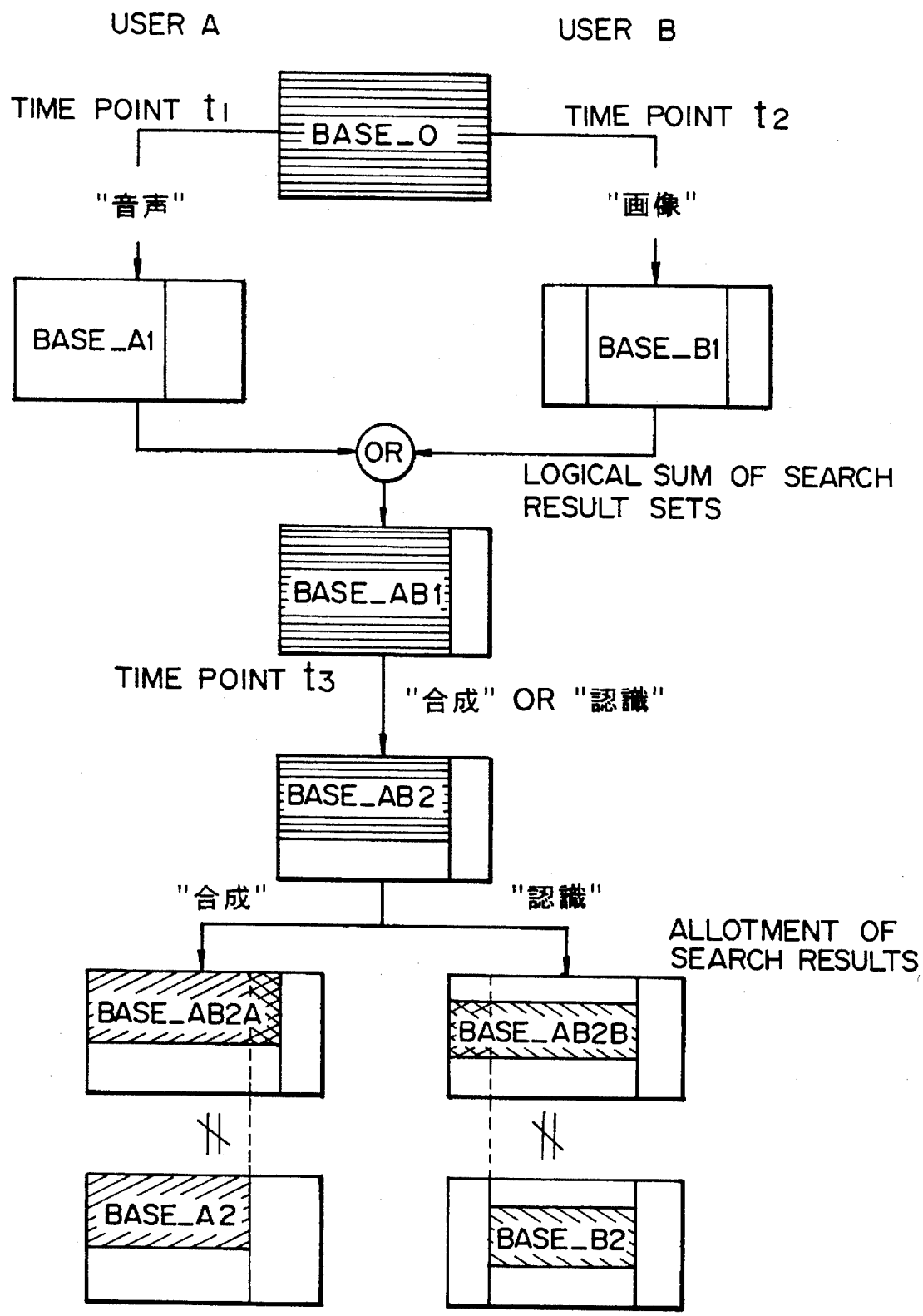
Figure 4:
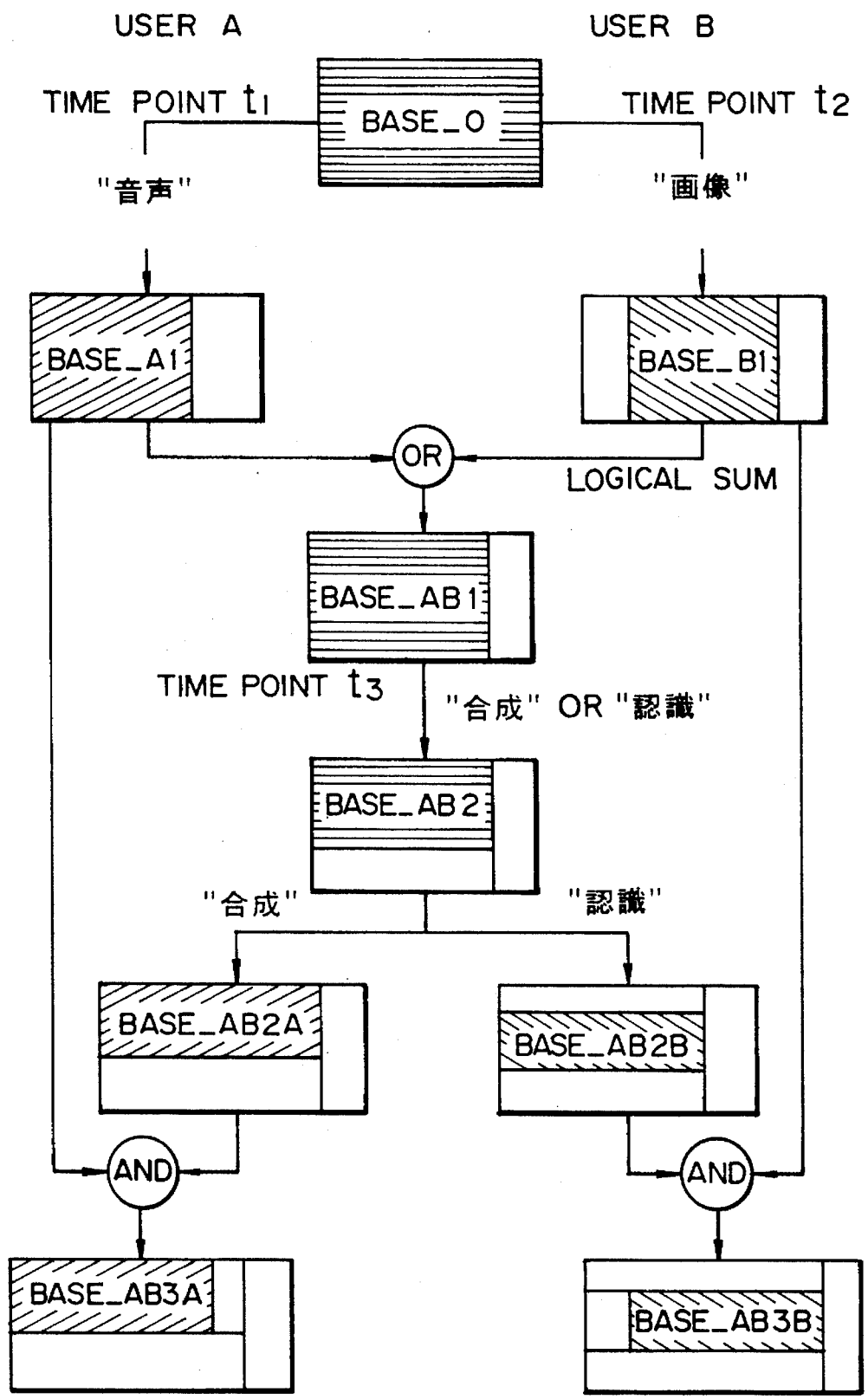
FIG. 4 is a conceptional view for illustrating a search result allotting processing performed in succession to an en-bloc search processing.

FIG. 22 shows a structure of the DB-TSM correspondence table used in the instant embodiment. As the items of the table, there are listed names of the databases (DB) and the identification numbers of the TSMs which accommodate the corresponding databases. Upon issuance of the connection request, this table is referred to on the basis of the name of the database designated as the object for the search, whereby a connection request is issued to the corresponding TSM. Assuming, by way of example, that the connection request for the search of press news is received from a terminal, connection requests are issued to the TSMs having the identifiers "1" and "2" by referencing the table shown in FIG. 2. Thereafter, this search request from the terminal is orientated to the TSMs identified by "1" and "2" or $TSM_1$ and $TSM_2$ shown in FIG. 20.

The queue buffer used in the instant embodiment is configured in a structure similar to that of the buffer used in the first embodiment. However, it should be mentioned that the queue buffers are prepared on the memory 1320 in a number equal to that of the TMSs, wherein the search requests from the terminals are stored in the queue buffers of the respective TMSs corresponding to the search requests together with the identifiers of the relevant terminals. For example, in case the search request for the press new database is issued from a terminal, this search request is registered in the queue buffers of the TSMs 1 and 2, respectively, as can be seen from FIG. 22.

Figure 23:
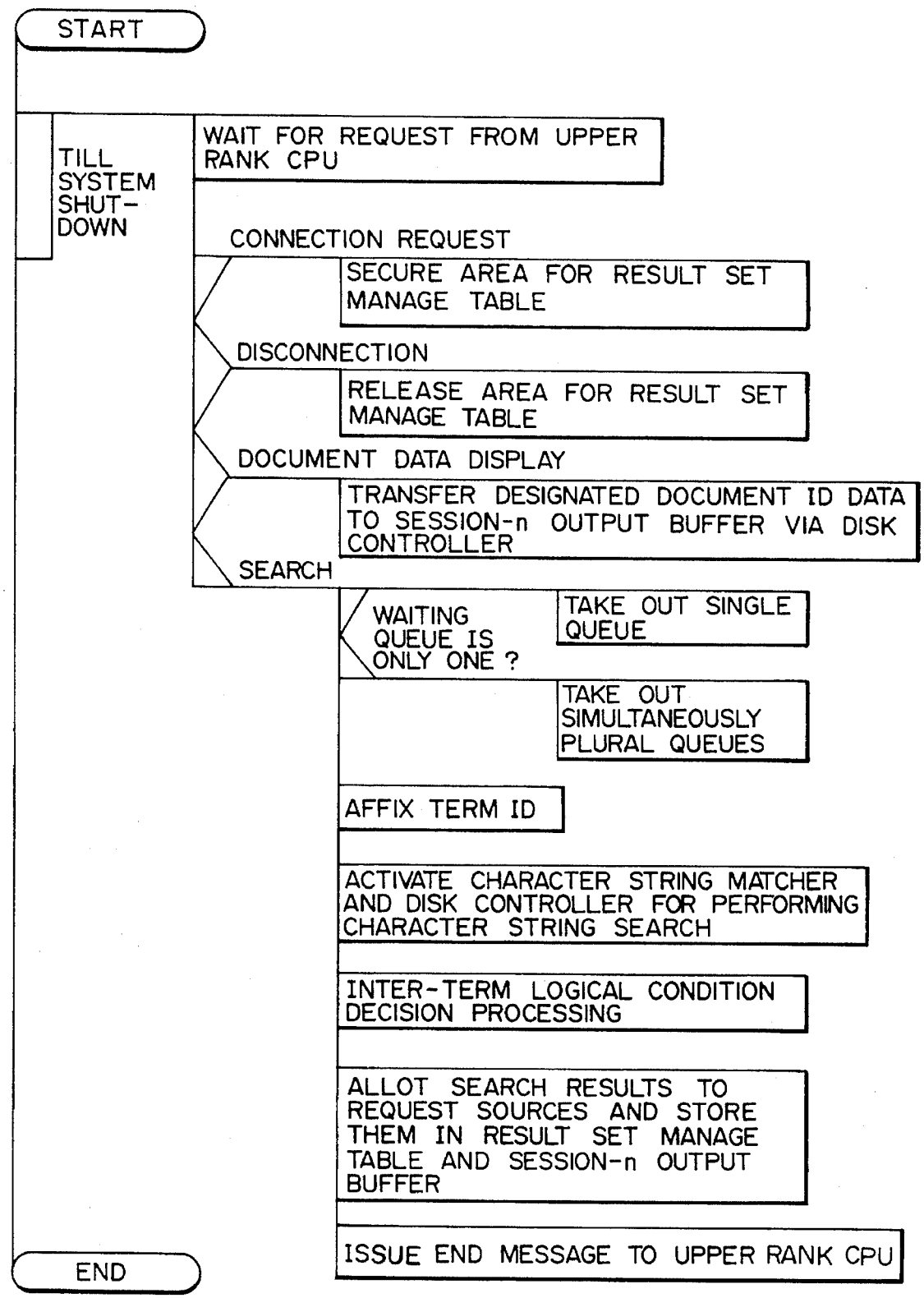
FIG. 23 is a PAD diagram showing a flow of processings executed by a control program running on a lower rank CPU.
Figure 24:
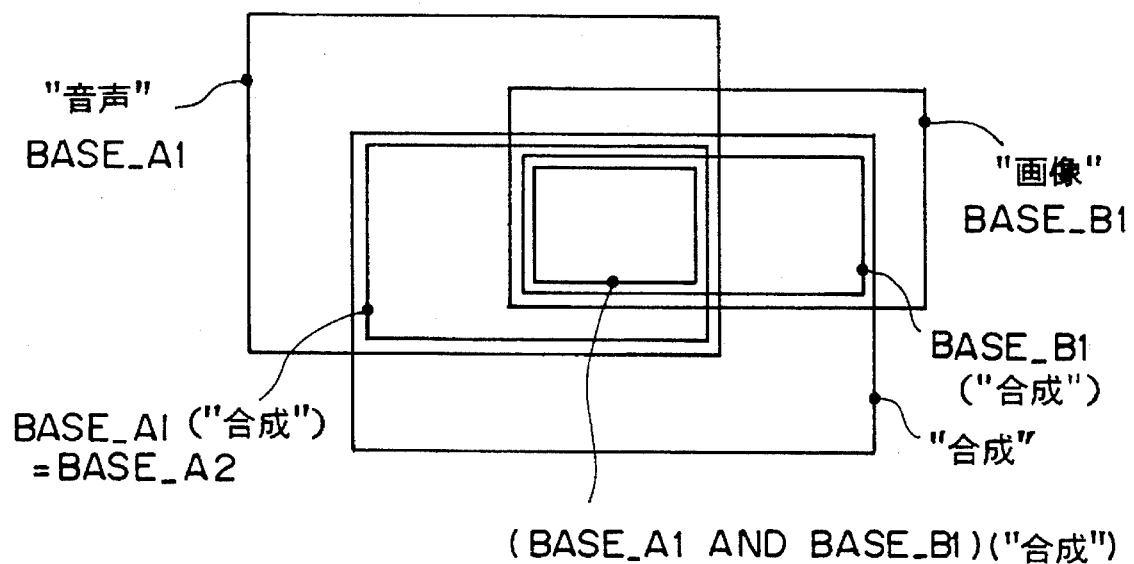
FIG. 24 is a diagram for illustrating relations among sets of search results.
Figure 25:
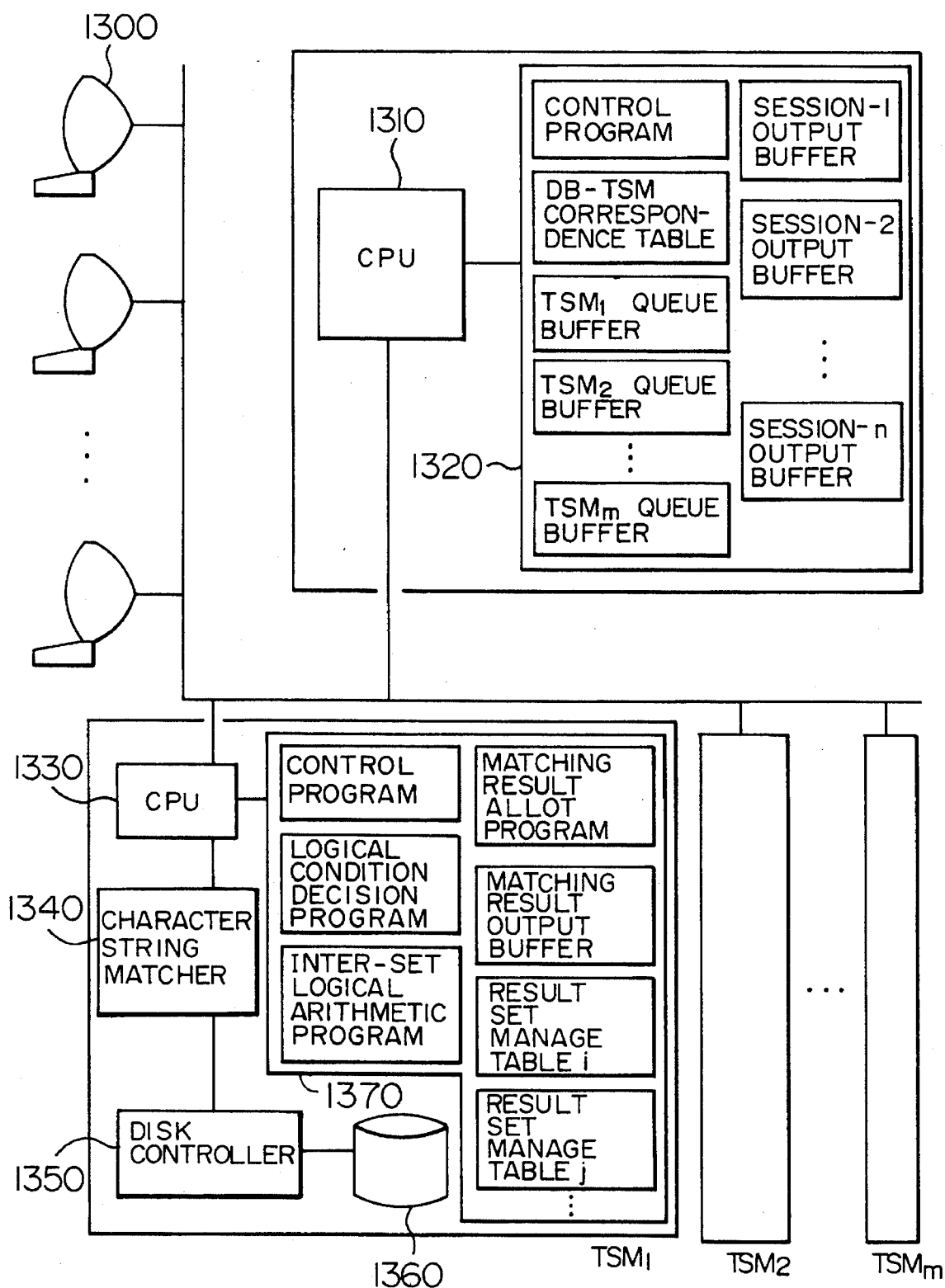
FIG. 25 is a block diagram showing a modification of the search system according to the second embodiment of the invention.

Next, description will be made of the processing performed by the CPU 1330. FIG. 23 is a PAD diagram showing a flow of processings executed by the CPU 1330. The CPU 1330 incorporated in each TSM is normally in the state waiting for the request from the CPU 1310 which is hierarchically of a upper rank than the CPU 1330. Upon reception of a connection request from the latter, the CPU 1330 secures on the memory 1370 an area for the result set management table for the terminal as connected, as can be seen in FIG. 23. On the other hand, when a release or disconnect request is received, the CPU 1310 releases the area secured for the result set management table for the corresponding terminal.

Upon reception of a document data display request, the CPU 1310 drives the disk controller 1350 to read out the text data corresponding to the document ID supplied together with document data display request, to thereby send the text data to the session-n output buffer which is managed by the upper rank CPU 1310 and which is an output buffer corresponding to the terminal which issued the data display request.

In the case of the operation performed in response to the search request(s), the number of search requests stacked up in the waiting queue buffer is checked. When only one search is stored, the single queue is fetched, while for a plurality of search requests, a corresponding number of queues are simultaneously taken out from the queue buffer, and the term ID allocation processing is performed, as described hereinbefore in conjunction with the first embodiment. Subsequently, the character string marcher 1340 and the magnetic disk controller 1350 are driven to perform the character string search for finding out the search term contained in the query statement. After the inter-term logical condition decision, the document ID of the document which coincides or matches with the query statement or condition is outputted to the matching result output buffer. Thereafter, the matching results are allotted to the search request source terminals, respectively, in accordance with the terminal identifiers. At that time, the set of the matching results is stored in the result set management tables associated with the search request source terminals for the purpose of utilizing these tables in the succeeding search step in the hierarchical search. Finally, a message indicating completion of the search processing as imposed is issued to the upper rank CPU 1310, and then all the search processings come to an end. The CPU 1330 is again set to the state for awaiting the processing request from the CPU 1310.

In the foregoing, the information search system according to the second embodiment of the present invention has been described. According to this embodiment, the full text search ca be executed by a plurality of TSMs which can operate in parallel with one another, because of provision of specific hardware dedicated for the character string search processing or the CPU dedicated only for the search processing.

In the case of the search system according to the second embodiment of the invention, a plurality of processing blocks $TSM_m$ (where m represents a given integer greater than one) are connected to the CPU (1310) which in turn is connected to a LAN (Local Area Network) to which a plurality of terminals constituting the search request sources are connected. In this conjunction, it should be appreciated that such a system configuration can equally be adopted in which the $TSM_m$ are connected to the same LAN as the terminals, to substantially same effect.

Besides, by adopting such arrangement that the session-n result set management table and the session-n output buffer secured in response to the connection request issued from the search requesting terminal can be secured separately or individually in response to the separate connection requests, respectively, issued from the same terminal, it is possible to manage separately the different sessions on the same terminal.

As will now be understood from the foregoing description, even a full text search processing which takes a lot of CPU occupation time can be executed by a plurality of terminals interconnected. More specifically, for the search processing requests issued simultaneously from a plurality of terminals, a plurality of query statements included in the requests can be processed en bloc through a single text scanning operation without need for making any one of the requests be put in the waiting state.

By providing the waiting queue buffer for registering therein successively the incoming requests, a plurality of search requests received in the course of execution of the current search request processing can be processed en bloc after completion of the current search processing.

The results of the search performed for plural search requests en bloc can distributively be sent to the search request sources of concern, respectively, through cooperation of the matching result allotting program and the session-n output buffer.

Furthermore, even in the case where a plurality of search requests are to be processed off-line, a plurality of search requests can be processed en bloc through the similar processing procedure, which means that the search requests can be disposed of with higher efficiency when compared with the search processing performed on a request-by-request basis.

Additionally, by providing the result set manage tables for storing the sets of the results of search on a request-source basis, such hierarchical search processing can be realized in which the ORed sets of the base sets corresponding to the search requests are first processed as the object for the search, the matching results as obtained are then allotted on a request-source basis and then ANDing operation is performed between the allotted results sets and the base sets, whereby the search requests issued by a plurality of search request source terminals can be processed en bloc.

Finally, by providing an upper rank CPU for accepting the search requests from the terminals in association with a plurality of lower rank CPUs which are in charge of plural character string matching processings, the text scan processing can be carried out in parallel by the plurality of CPUs, to make it possible to realize a high-speed full-text search.

We claim:

1. A document information search method for retrieving a document containing a specific character string on the basis of a plurality of search requests issued from a plurality of search request sources, each of the plurality of search request sources including a search object and issuing a search condition, the method comprising the steps of:

storing a plurality of search requests received from said plurality of search request sources; and, executing a search processing for said stored plurality of search requests by:

logical-OR-combining each search object of each of said plurality of search request sources to generate a first combined search object;

searching said first combined search object to locate a plurality of documents satisfying each search condition of each of said plurality of search request sources;

dividing the plurality of documents into a plurality of sets of documents each of said plurality of sets corresponding to a one of said plurality of search request sources; and, logical-AND-combining each of said plurality of sets of documents with a corresponding one of said search objects to generate a search result for each of said plurality of search requests.

2. A document information search method according to claim 1, wherein the step of storing the plurality of search requests issued from said plurality of search request sources includes storing the plurality of search requests in a sequential order corresponding to an order in which the plurality of search requests are accepted.

3. A document information search method according to claim 1, further including:

providing a plurality of data subjected to search upon storage of said plurality of search requests, adding a search data identifier indicating the data to be searched in response to said search request to said search request, and upon performing said search processing for said plurality of search requests, performing the search processing only for those search requests of said stored plurality of search requests which are assigned with the same search data identifier.

4. A document information search method according to claim 1, further including the steps of:

upon storing said plurality of search requests, storing identification information indicating ones of the search request sources issuing ones of said plurality of search requests in association with said search requests, respectively, and after completion of a character string search processing for said plurality of search requests, distributively outputting the results of said search processing to the associated search request sources on the basis of said identification information.

5. A document information search method according to claim 4, further including the steps of:

storing results of prior searches for the search requests issued by each of said search requests sources as a set of search results for each of said search request sources, and performing a hierarchical search for screening said set of search results by adding a further search condition to said set of search results.

6. A document information search method according to claim 5, further including, upon performing said search processing for said stored plurality of search requests, the steps of:

performing a search processing for all document data, allotting the results of said search processing to said search request sources, and performing an inter-set AND operation for each of said search request sources between a set of prior search results and a new set of search results obtained through said allotment, to thereby realize said screening.

7. A document information search method according to claim 5, further including, upon performing said search processing for said stored plurality of search requests, the steps of:

performing a search processing on the basis of a set of search results resulting from a logical-OR operation performed on the search result sets corresponding to said search request sources, classifying the results of said search processing on the basis of the search request sources, and performing an inter-set logical-AND operation processing between the set of the search results corresponding to the search request sources for which said logical-OR operation is performed and the new set of said search results as classified, to thereby realize said screening.

8. A document information search method for retrieving a document for each document data containing specific character strings stored individually on the basis of a plurality of search requests issued from a plurality of search request sources, each of the plurality of search request sources including a search object and issuing a search condition, the method comprising the steps of:

generating a correspondence table indicating types of data stored in each of said individual document data, storing a plurality of search requests separately for each of said document data, storing a further plurality of search requests received for said document data while executing a search processing on said document data, and processing simultaneously the search requests as stored by:

logical-OR-combining each search object of each of said plurality of search request sources to generate a first combined search object;

searching said first combined search object to locate a plurality of documents satisfying each search condition of each of said plurality of search request sources;

dividing the plurality of documents into a plurality of sets of documents each of said plurality of sets corresponding to a one of said plurality of search request sources; and, logical-AND-combining each of said plurality of sets of documents with a corresponding one of said search objects to generate a search result for each of said plurality of search requests.

9. A document information search method according to claim 8, the step of storing the plurality of search requests issued from said plurality of search request sources includes storing the plurality of search requests in a sequential order corresponding to an order in which the plurality of search requests are accepted.

10. A document information search method according to claim 9, further including the steps of:

storing identification information indicating the search request sources that issued said search requests in association with said search requests, and after completion of a character string search processing for said search requests, distributively outputting the results of said search processing to the relevant search request sources on the basis of said identification information.

11. A document information search method according to claim 10, further including the steps of:

storing results of prior searches for the search requests issued by each of said search requests sources as a set of search results for each of said search request sources, and performing a hierarchical search for screening said set of search results by adding a further search condition to said set of search results.

12. A document information search method according to claim 11, further including, upon performing the search processing for said plurality of search requests, the steps of:

performing the search processing for all document data, classifying the results of said search processing for each of said search request sources, performing an inter-set logical AND operation for each of said search request sources between the prior set of the search results and a new set of search results obtained through said classification, and subjecting the results of said logical AND operation to said screening for each of said document data.

13. A document information search method according to claim 11, further including, upon performing said search processing for said stored plurality of search requests, the steps of:

performing a search processing on the basis of a set of search results resulting from a logical-OR operation performed on the search result sets corresponding to said search request sources, classifying the results of said search processing on the basis of the search request sources, and performing an inter-set logical-AND operation processing between the set of the search results corresponding to the search request sources for which said logical-OR operation is performed and the new set of said search results as classified, whereby the screening is performed for said document data on the basis of the results of said logical AND operation processing.

14. A document information search method for retrieving a document containing a specific character string, on the basis of a plurality of search requests issued from a plurality of search request sources, each of the plurality of search request sources including a search object and issuing a search condition, the method comprising the steps of:

storing a plurality of search requests; and performing search processing for said plurality of search requests by:

logical-OR-combining each search object of each of said plurality of search request sources to generate a first combined search object;

searching said first combined search object to locate a plurality of documents satisfying each search condition of each of said plurality of search request sources;

dividing the plurality of documents into a plurality of sets of documents each of said plurality of sets corresponding to a one of said plurality of search request sources; and, logical-AND-combining each of said plurality of sets of documents with a corresponding one of said search objects to generate a search result for each of said plurality of search requests.

15. A document information search method for retrieving a document containing a specific character string on the basis of a plurality of search requests issued from a plurality of search request sources., each of the plurality of search request sources including a search object and issuing a search condition, the method comprising the steps of:

storing a plurality of search requests together with identification information indicating ones of said plurality of search request sources corresponding to ones of said search requests, respectively, performing search processing for a plurality of said search requests by:

logical-OR-combining each search object of each of said plurality of search request sources to generate a first combined search object;

searching said first combined search object to locate a plurality of documents satisfying each search condition of each of said plurality of search request sources;

dividing the plurality of documents into a plurality of sets of documents each of said plurality of sets corresponding to a one of said plurality of search request sources; and, logical-AND-combining each of said plurality of sets of documents with a corresponding one of said search objects to generate a plurality of search results corresponding to said plurality of search requests; and, outputting said plurality of search results distributively to said search request sources on the basis of said identification information after completion of said search processing.

16. A document information search system including a plurality of search request sources connected thereto for retrieving a document containing a specific character string on the basis of a plurality of search requests issued from said plurality of search request sources, each of the plurality of search request sources including a search object and issuing a search condition, the system comprising:

search request storing means for storing a plurality of search requests which are received from said plurality of search request sources while the system is executing a prior search processing based on a prior search request issued from said plurality of search request sources; and search processing means for executing a search processing for said stored search requests, the search processing means including:

means for logical-OR-combining each search object of each of said plurality of search request sources to generate a first combined search object;

means for searching said first combined search object to locate a plurality of documents satisfying each search condition of each of said plurality of search request sources;

means for dividing the plurality of documents into a plurality of sets of documents each of said plurality of sets corresponding to a one of said plurality of search request sources; and, means for logical-AND-combining each of said plurality of sets of documents with a corresponding one of said search objects to generate a search result for each of said plurality of search requests.

17. A document information search system according to claim 16, wherein said search request storing means comprises a queue buffer.

18. A document information search system according to claim 16, further comprising:

means for storing a plurality of data subjected to a search, means, upon storage of said search request, for adding a search data identifier to said search request, the search data identifier indicating the data to be searched in response to said search request and means, upon performing the search processing for said plurality of search requests, for performing the search processing only for those search requests of said plurality of search requests stored in said search request storing means which are assigned with the same search data identifier.

19. A document information search system according to claim 16, wherein said search request storage means includes means for storing identification information indicating first search request sources that issued said search requests, and means for distributively outputting, after completion of a character string search processing, the results of said search processing to relevant search request sources on the basis of said identification information.

20. A document information search system according to claim 19, further comprising:

result set managing/storing means for storing results of prior searches performed in the past for the search requests issued by each of said plurality of search request sources as a set of search results, and means for performing a hierarchical search on said set of search results stored in said result set managing/storing means on the basis of the search request issued from the relevant search request source, thereby effecting a screening processing for screening the documents to be searched.

21. A document information search system according to claim 19, further including:

means for performing the search processing for all document data upon performing the search processings for said plurality of search requests, means for classifying the results of said search processing for each of said search request sources, and means for performing an inter-set AND operation for each of said search request sources between the set of said prior search results and stored in the corresponding result set managing/storing means and a new set of search results obtained through said classification, to thereby realize said screening processing.

22. A document information search system according to claim 20, further including:

means for performing, upon performing the search processings for said plurality of search requests, search processing based on a set of search results which results from a logical OR operation performed on the search result sets corresponding to said search request sources, means for classifying the results of said search processing on the basis of the search request sources, and means for performing an inter-set logical AND operation processing between the set of the prior search results which correspond to the search request sources, respectively, and the new set of the search results as classified to said search request sources, to thereby realize said screening processing.

23. An information search system having a plurality of search request sources connected thereto and a plurality of character string search means connected to said search system and dedicated for storing respective document data and searching documents containing specific characters on the basis of a plurality of search requests issued from said search request sources, each of the plurality of search request sources including a search object and issuing a search condition, comprising:

a plurality of storage means provided in said character string search means, respectively, for storing i) data indicating correspondence relations existing between the said character string search means and types of document data stored in said character string search means, respectively, and ii) search requests to be sent to said character string search means, respectively, means for storing, upon reception of given search requests which require for processing thereof a character string search means which is being used for processing a prior search request, said given search requests in said storage means, and means for processing said stored search requests by:
 logical-OR-combining each search object of each of said plurality of search request sources to generate a first combined search object;
 searching said first combined search object to locate a plurality of documents satisfying each search condition of each of said plurality of search request sources;
 dividing the plurality of documents into a plurality of sets of documents each of said plurality of sets corresponding to a one of said plurality of search request sources; and,
 logical-AND-combining each of said plurality of sets of documents with a corresponding one of said search objects to generate a search result for each of said plurality of search requests.

24. An information search system according to claim 23, wherein said storage means comprises a queue buffer.

25. An information search system according to claim 23, wherein
 said storage means includes means for storing identification information indicating ones of the search request sources that issued ones of said search requests,
 means for distributively outputting, after completion of a character string search processing, the results of said search to the relevant search request sources based on said identification information.

26. An information search system according to claim 25, further comprising:
 result set managing/storing means for storing results of prior searches performed in the past for the search requests issued by each of said plurality of search request sources as a set of search results,
 means for performing a hierarchical search on said set of search results stored in said result set managing/storing means by adding search conditions in dependence on the search request issued from the relevant search request source, for thereby effecting a screening processing for screening the search results included in said set.

27. An information search system according to claim 25, further including:
 means for performing, upon performing the search processings for said plurality of search requests, a search processing for all document data stored in said character string search means,
 means for classifying the results of said search processing for each of said search request sources,
 means for performing an inter-set logical AND operation for each of said search request sources between the set of prior search results obtained in the past and a new set of search results obtained through said classification, to thereby realize said screening processing.

28. An information search system according to claim 25, further including:
 means for performing, upon performing the search processings for said plurality of search requests, a search processing based on a set of the search results which result from a logical OR operation performed on the search result sets corresponding to said search request sources,
 means for classifying the results of said search processing on the basis of the search request sources, and
 means for performing an inter-set logical AND operation processing between the set of the search results corresponding to the search request sources, respectively, and the new set of the search results as classified to said search request sources, to thereby realize said screening processing.

29. A document information search system for retrieving a document containing a specific character string, based on a plurality of search requests originated from a plurality of operatively associated search request sources, each of the plurality of search request sources including a search object and issuing a search condition, the system comprising:
 search request storing means for storing a plurality of search requests; and
 means for performing a search processing for said plurality of the search requests when said plurality of search requests stored in said search request storing means amount to a predetermined number by:
 logical-OR-combining each search object of each of said plurality of search request sources to generate a first combined search object;
 searching said first combined search object to locate a plurality of documents satisfying each search condition of each of said plurality of search request sources;
 dividing the plurality of documents into a plurality of sets of documents each of said plurality of sets corresponding to a one of said plurality of search request sources; and,
 logical-AND-combining each of said plurality of sets of documents with a corresponding one of said search objects to generate a search result for each of said plurality of search requests.

30. A document information search system for searching a document containing a specific character string based on a plurality of search requests originated from a plurality of operatively associated search request sources, each of the plurality of search request sources including a search object and issuing a search condition, the document information search system comprising:
 search request storing means for storing a plurality of search requests together with corresponding identification information indicating search request sources in which said search requests origin;
 means for performing a search processing for said plurality of the search requests when said plurality of search requests stored in said search request storing means amount to a predetermined number by:
 logical-OR-combining each search object of each of said plurality of search request sources to generate a first combined search object;
 searching said first combined search object to locate a plurality of documents satisfying each search condition of each of said plurality of search request sources;

dividing the plurality of documents into a plurality of sets of documents each of said plurality of sets corresponding to a one of said plurality of search request sources; and, logical-AND-combining each of said plurality of sets of documents with a corresponding one of said search objects to generate a search result for each of said plurality of search requests; and means for outputting distributively the results of the search processing to the corresponding search request sources, respectively, on the basis of said identification information, after completion of said search processing.

* * * * *